United States Patent
Tanaka et al.

(10) Patent No.: US 8,529,236 B2
(45) Date of Patent: Sep. 10, 2013

(54) VULCANIZING SYSTEM

(75) Inventors: Kazunari Tanaka, Tokyo (JP); Naohiko Matsuda, Tokyo (JP); Kazutoshi Yoko, Tokyo (JP); Hideki Fukuda, Tokyo (JP); Koji Shintani, Tokyo (JP); Keiichi Tomoto, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/389,461

(22) PCT Filed: Mar. 22, 2011

(86) PCT No.: PCT/JP2011/001679
§ 371 (c)(1),
(2), (4) Date: May 2, 2012

(87) PCT Pub. No.: WO2012/023224
PCT Pub. Date: Feb. 23, 2012

(65) Prior Publication Data
US 2012/0301565 A1 Nov. 29, 2012

(30) Foreign Application Priority Data
Aug. 19, 2010 (JP) ................ 2010-183925

(51) Int. Cl.
*B29C 33/04* (2006.01)
(52) U.S. Cl.
USPC ........................... 425/34.1; 425/40; 425/42
(58) Field of Classification Search
USPC .......................... 425/34.1, 40, 42
See application file for complete search history.

(56) References Cited

U.S. PATENT DOCUMENTS

| | | | |
|---|---|---|---|
| 6,474,968 B1 * | 11/2002 | Mitamura et al. | 425/42 |
| 7,604,760 B2 * | 10/2009 | Christopher et al. | 425/40 |
| 7,985,359 B2 * | 7/2011 | Mitamura et al. | 425/42 |
| 2010/0007038 A1 | 1/2010 | Mitamura et al. | |

FOREIGN PATENT DOCUMENTS

| | | |
|---|---|---|
| JP | 9019931 | 1/1997 |
| JP | 9019931 A | 1/1997 |
| JP | 9076239 | 3/1997 |
| JP | 9076239 A | 3/1997 |
| JP | 9300356 | 11/1997 |
| JP | 9300356 A | 11/1997 |

(Continued)

OTHER PUBLICATIONS

International Search Report for PCT/JP2011/001679 mailed Apr. 19, 2011.

(Continued)

*Primary Examiner* — James Mackey
(74) *Attorney, Agent, or Firm* — Kanesaka Berner & Partners, LLP

(57) ABSTRACT

In a vulcanizing system of the present invention, a temperature booster and a pressure booster are provided on a steam supply path connecting vulcanizers that belong to groups and a boiler allocated to the groups. The temperature booster and the pressure booster are sequentially arranged from an upstream side, a second branch supply path for supplying the steam to a mold between the temperature booster and the pressure booster is branched from the steam supply path. The second branch supply path is preferably in a form of allowing the steam temperature-boosted by the temperature booster to be supplied to the mold by bypassing the pressure booster.

9 Claims, 15 Drawing Sheets

(56) References Cited

FOREIGN PATENT DOCUMENTS

| | | |
|---|---|---|
| JP | 2006231931 | 9/2006 |
| JP | 2006231931 A | 9/2006 |
| JP | 2008162269 | 7/2008 |

OTHER PUBLICATIONS

Notification of Transmittal of Copies of Translation of the International Preliminary Report on Patentability, as mailed on Mar. 28, 2013.

* cited by examiner

VULCANIZING SYSTEM

RELATED APPLICATIONS

The present application is a National Phase of International Application Number PCT/JP2011/001679 filed Mar. 22, 2011, and claims priority from, Japanese Application Number 2010-183925 filed Aug. 19, 2010.

TECHNICAL FIELD

The present invention relates to a method of vulcanizing a raw tire and its system.

BACKGROUND ART

Normally, to vulcanize a raw tire, a mold (a metal mold) having its inside filled with a raw tire is heated by a heating medium, and a heating medium including high-temperature, high-heat-capacity steam and a pressurizing medium including noncondensable gas such as inert gas or nitrogen gas are supplied to an internal space of the raw tire, thereby heating the raw tire from outside and inside (for example, refer to Patent Document 1). Note that the heating medium and the pressurizing medium may be hereinafter collectively referred to as a vulcanization medium.

In general, as shown in FIG. 15, a vulcanizing system 300 includes a boiler 102 which is located outside a building 104, a plurality of (for example, twenty to hundred) vulcanizers 101 which are placed in the building 104, and a piping 103 which connects the boiler 102 and the vulcanizers 101. In the vulcanizing system 300, steam generated by the boiler 102 is supplied to each vulcanizer 101. In this case, steam is generally supplied from one boiler 102 to every vulcanizer 101 in the building 104. Since this boiler 102 is large, it cannot be placed near the vulcanizers 101, and therefore the total length of the piping 103 between each vulcanizer 101 and the boiler 102 is as long as several hundred meters.

In the structure as described above, however, when steam is supplied from the boiler 102 to via the piping 103 to each vulcanizer 101, a considerable amount of heat of steam is lost by heat dissipation from the piping 103, thereby causing a large energy loss. According to studies by the inventors, a trial calculation indicates that approximately ⅓ of the amount of heat introduced from the boiler 102 is dissipated.

To prevent this problem, Patent Document 2 suggests that a heat supply means is separately provided for each vulcanizer, the heat supply means capable of heating a raw tire by heating a heating medium and supplying an amount of heat to a bladder via the heated heating medium. Patent Document 2 descries a heat supply means having a circular route and a temperature control apparatus. The circular route takes out a heating medium in the bladder outside the vulcanizers and returns the taken-out heating medium to the inside the bladder. Outside the vulcanizers, the temperature control apparatus controls supply power to an electric heater for heating the heating medium circulated in the circular route.

CITATION LIST

Patent Document

Patent Document 1: Japanese Patent No. 3699206
Patent Document 2: Japanese Patent Laid-Open No. 2006-231931

SUMMARY OF THE INVENTION

Technical Problems to be Solved by the Invention

According to Patent Document 2, while an energy loss in each vulcanizer can be reduced, heat dissipation from the piping connecting the boiler and the vulcanizers is still present, and therefore an energy loss still remains large as the entire vulcanizing system including a plurality of vulcanizers.

The present invention was made in view of these technical problems, and has an object of reducing an energy loss as the entire vulcanizing system including a plurality of vulcanizers.

Solution to the Problems

The inventors have studied a boiler that is smaller in size than a large-sized boiler and can be placed near vulcanizers. For example, in a vulcanizing system in which one large-sized boiler supplies steam, if the large-sized boiler is replaced by small-sized boilers 30-1 to 30-$n$ and the number of vulcanizers 10-1 and 10-$n$ to which steam is supplied is suppressed to several as shown in FIG. 6, the boilers 30-1 to 30-$n$ can be placed near the vulcanizers 10-1 to 10-$n$. In this case, a plurality of small-sized boilers 30-1 to 30-$n$ are required to support all vulcanizers 10-1 to 10-$n$. Here, a vulcanizing system in which steam is supplied from a large-sized boiler to vulcanizers is referred to as a collective type, and a vulcanizing system in which steam is supplied from a plurality of small-sized boilers to vulcanizers is referred to as a distributed type.

Meanwhile, for vulcanization, a raw tire is required to be heated to approximately 150° C. to 200° C. Also, it is considered that steam supplied to the inside of the raw tire is required to have a pressure of approximately 1.5 Mpa to 2.0 Mpa. However, a small-sized boiler that can be used in a distributed-type vulcanizing system has small capabilities and the temperature of suppliable steam is approximately 100° C., and the pressure is also low. Therefore, a raw tire cannot be vulcanized by merely replacing a large-sized boiler by the small-sized boilers 30-1 to 30-$n$. Thus, the inventors has conceived an idea that a temperature booster and a pressure booster are provided between a boiler and vulcanizers and steam generated by the small-sized boiler is supplied to the vulcanizers with the temperature and pressure of the steam boosted to those allowing vulcanization.

The present invention based on this idea is directed to a distributed-type vulcanizing system on the precondition that a plurality of vulcanizers are classified into groups, boilers corresponding to the number of groups are provided, and each of the boilers supplying steam is allocated to each of the groups. The vulcanizing system of the present invention is characterized in that a temperature booster and a pressure booster are provided on a steam supply path connecting the vulcanizer that belongs to each of the groups and the boiler allocated to the group.

In the vulcanizing system of the present invention, a piping length from the boilers and the vulcanizers can be shortened, and therefore heat dissipation from the piping can be significantly decreased. According to a trial calculation by the inventors, the distributed-type vulcanizing system can decrease heat dissipation from the piping by approximately 30% compared with a collective-type one when steam is supplied to the same number of vulcanizers.

Also, in the distributed-type vulcanizing system of the present invention, even when a boiler allocated to each group is small in size, heating and pressure boosting can be made by the temperature booster and the pressure booster to supply steam to the vulcanizers belonging to the group, thereby allowing vulcanization of the raw tire without any trouble.

To vulcanize and mold a raw tire, a mold filled with the raw tire inside is heated by steam, and steam at high temperature and high pressure is supplied to an internal space of the raw tire. In this manner, the steam at high temperature and high pressure is supplied to the internal space of the raw tire because steam to be supplied to the mold is not required to be at high pressure. Therefore, as for the steam to be supplied to the mold, the heating is conducted through the temperature booster, but the steam is not let pass through the pressure booster but is supplied to each vulcanizer, thereby allowing a decease in energy loss at the time of operating the pressure booster. To achieve this, the vulcanizing system of the present invention preferably adopts the following structure. That is, when the boiler is taken as being on an upstream side, the temperature booster and the pressure booster are sequentially provided from the upstream side. A mold-destined supply path for supplying the steam to the mold is branched from the steam supply path between the temperature booster and the pressure booster, and the mold-destined supply path allows the steam temperature-boosted by the temperature booster to be supplied to the mold by bypassing the pressure booster.

Since the saturated steam supplied to each vulcanizer is condensed, a drain occurs in the vulcanizer. Since the drain has a temperature equal to or higher than 100° C., waste heat of the drain occurring in the vulcanizer is collected for use in saving energy in the vulcanizing system. Therefore, the present invention preferably includes a circular route for collecting the drain occurring in the vulcanizer for circulation to the boiler or the steam supply route. In this case, with the temperature booster being provided on the circular route and the drain being temperature-boosted by the temperature booster, the drain can be circulated to the boiler or the steam supply route.

To supply steam from one boiler to each of vulcanizers belonging to the group, the steam supply route is configured of a main supply path connected to the boiler and a branch path branched from the main supply path toward the vulcanizer that belongs to the group. The temperature booster and the pressure booster may be provided on either of the main supply path and the branch path on the precondition that the steam to be supplied to the vulcanizer passes through the temperature booster and the pressure booster. That is, in the present invention, either one or both of the temperature booster and the pressure booster can be provided on either one or both of the main supply path and the branch path.

Meanwhile, in order to supplement the lack of capabilities of a small-sized boiler, it can be thought that the pressurizing medium (noncondensable gas) is introduced together with the heating medium (steam) to increase the total pressure of the vulcanization medium and, furthermore, a heater is used to boost the temperature of the heating medium and the pressurizing medium. However, while the total pressure of the vulcanization medium is increased, the partial pressure of the steam is not increased. Therefore, the temperature of condensed water generated by condensing the steam in a bladder is decreased, thereby possibly hindering the progress of vulcanization. For example, when the saturated steam to be supplied from a small-sized boiler is at approximately 150° C. (a saturated steam temperature at 0.5 MPa), the temperature of the condensed water is lower than a temperature required in the latter half of vulcanization (for example, approximately 180° C.).

Thus, in the present invention, a tire is vulcanized in the following procedure.

A tire vulcanizing process is broadly classified into a temperature-boosting process and a pressurizing process.

In the temperature-boosting process, the temperature of a raw tire is boosted normally from ambient temperature toward a vulcanization target temperature. In the course of this temperature-boosting process, a vulcanization reaction starts.

In the pressurizing step, a pressurizing medium is supplied to an internal space of the raw tire in the course of boosting the temperature toward the vulcanization target temperature to provide a pressure in addition to a temperature required for vulcanization.

In the present invention, the temperature-boosting process is performed in the following procedure.

Overheated steam generated by heating saturated steam generated in the boiler is supplied to the internal space of the raw tire (this may be hereinafter referred to as an internal space) to boost the temperature of the raw tire. This supply of overheated steam may be performed from the start of vulcanization, but a procedure can also be taken such that saturated steam is supplied at first and then overheated steam generated by heating the saturated steam is supplied.

When a small-sized boiler is used, the temperature and pressure of saturated steam to be supplied at first does not satisfy the vulcanization target temperature and a vulcanization target pressure. However, it is not required to satisfy the vulcanization target temperature and the vulcanization target pressure initially from the start of vulcanization, and it is sufficient to boost the temperature of the raw tire to a certain temperature. Thus, initially, by supplying only the saturated steam generated by the boiler, energy saving and a reduction in production cost can be achieved.

As being supplied with saturated steam, the temperature of the raw tire is boosted and vulcanization proceeds. However, due to a low temperature of the saturated steam, the temperature of the condensed water is low, which may possibly hinder the progress of vulcanization. To prevent this, by heating the saturated steam in mid course to generate overheated steam at high temperature, a decrease in the progress of vulcanization, in other words, a decrease in a heating rate, of the raw tire is inhibited.

As described above, in the pressurizing process, the pressurizing medium is added to the overheated steam for supply to the raw tire. There are some options for the timing of adding the pressurizing medium, any of which is included in the present invention.

In a first option, after the start of first supplying overheated steam obtained by heating the saturated steam to the internal space, a pressurizing medium is added to this overheated steam.

In a second option, after the start of first supplying a vulcanization medium including saturated steam and a pressurizing medium to the internal space, this vulcanization medium is heated to change the saturated steam included in the vulcanization medium to overheated steam.

In a third option, simultaneously with the start of supplying the vulcanization medium including the saturated steam and the pressurizing medium to the internal space, this vulcanization medium is heated to change the saturated steam included in the vulcanization medium to overheated steam.

In any of these cases, the supply of the vulcanization medium including the overheated steam and the pressurizing medium to the internal space of the raw tire starts in the course of the temperature-boosting process.

While vulcanization of the tire ends when the temperature reaches the vulcanization target temperature, the temperature may be kept for a predetermined time after reaching the vulcanization target temperature. In this case, it is required to prevent the tire from being overheated to a temperature exceeding the vulcanization target temperature. If the tire is heated to a temperature higher than required, the quality of the produced tire is adversely affected.

Thus, in the present invention, temperature control is preferably performed after the temperature of the raw tire to be vulcanized reaches a temperature defined with reference to the vulcanization target temperature. The temperature control is executed by alternately performing cooling control and heating control.

This cooling control has two options.

In a first option, the overheated steam included in the supplied vulcanization medium is switched to saturated steam. In this case, the vulcanization medium to be supplied includes saturated steam and a pressurizing medium, and has a lower temperature.

In a second option, a ratio of the pressurizing medium included in the supplied vulcanization medium is increased. In this case, thermal conductivity of the vulcanization medium is decreased, and a boost in temperature of the tire can be suppressed.

On the other hand, the temperature may become too low only with the cooling control. Therefore, when the cooling control is performed, it is required to perform heating control together. A main point of the heating control is to return the vulcanization medium to a state before any of two options in the cooling control. That is, correspondingly to the first option, the saturated steam included in the supplied vulcanization medium is switched to overheated steam. Also, correspondingly to the second option, the ratio of the pressurizing medium included in the supplied vulcanization medium can be decreased.

When a raw tire is vulcanized and molded, steam is supplied also to the mold, and the raw tire is heated from outside. However, the steam supplied to the mold is not for the purpose of pressurizing, and the pressure of the steam may be even low. Therefore, a vulcanization medium including a pressurizing medium is not required. Thus, as the steam to be supplied to the mold, saturated steam or overheated steam is preferably singly supplied to the mold. With this, the use amount of the pressurizing medium can be decreased.

The tire vulcanizing method of the present invention can be applied to a tire vulcanizing system in which saturated steam generated in one boiler is concurrently supplied to each of a plurality of vulcanizers.

This system includes a first supply path for supplying saturated steam toward an internal space of a raw tire held in a mold of each of the plurality of vulcanizers and a second supply path branched from the first supply path for supplying the saturated steam toward the mold to heat the raw tire from outside.

Also, this system includes a first heater provided on the first supply path for heating the saturated steam generated in the boiler to generate overheated steam, a pressurizing medium supply path for supplying a pressurizing medium to the first supply path, and a control unit controlling an operation of the tire vulcanizing system.

This control unit causes the tire vulcanizing system to execute a temperature-boosting process of boosting the temperature of the raw tire toward a vulcanization target temperature and a pressurizing process of supplying the pressurizing medium to an internal space of the raw tire in the course of the temperature-boosting process toward the vulcanization target temperature to provide a temperature and a pressure required for vulcanization.

In the temperature-boosting process, the control unit performs control so that the overheated steam generated by heating the saturated steam generated in the boiler is supplied to the internal space via the first supply path to boost the temperature of the raw tire. Preferably, the control unit performs control so that the saturated steam generated in the boiler is supplied to the internal space of the raw tire and then the overheated steam generated by heating the saturated steam is supplied to the internal space to boost the temperature of the raw tire.

Furthermore, in the pressurizing process, the control unit causes the pressurizing medium to be introduced from the pressurizing medium supply path to the first supply path, and causes a vulcanization medium including the overheated steam and the pressurizing medium to be supplied to the internal space to provide a temperature and a pressure required for vulcanization.

The control unit can perform temperature control in which cooling control and heating control are alternately performed when the temperature of the raw tire to be vulcanized reaches a temperature defined with reference to the vulcanization target temperature.

In this cooling control, either one or both of first cooling control and second cooling control can be performed. The first cooling control switches the overheated steam included in the supplied vulcanization medium to the saturated steam by stopping an operation of the first heater. The second cooling control increases a ratio of the pressurizing medium included in the supplied vulcanization medium by increasing an amount of the pressurizing medium introduced from the pressurizing medium supply path.

Also, in the heating control, either one or both of first heating control and second heating control can be performed. The first heating control, corresponding to the first cooling control, switches the saturated steam included in the supplied vulcanization medium to the overheated steam by operating the first heater. The second heating control, corresponding to the second cooling control, decreases the ratio of the pressurizing medium included in the vulcanization medium by decreasing the amount of the pressurizing medium introduced from the pressurizing medium supply path.

As a structure for supplying saturated steam or overheated steam singly to a mold, in the vulcanizing system of the present invention, when the boiler is taken as being on an upstream side, a second heater is provided on a part of the first supply path which is located on an upstream side with respect to the first heater, and the second supply path is between the first heater and the second heater and is branched from a part of the first supply path which is located on an upstream side with respect to the pressurizing medium supply path.

According to the distributed-type vulcanizing system of the present invention, a piping length from the boilers to the vulcanizers can be shortened, and therefore heat dissipation from the piping can be significantly decreased. Also, in the distributed-type vulcanizing system of the present invention, even when a small-sized boiler is used, the temperature and the pressure can be boosted by the temperature booster and the pressure booster to supply steam to the vulcanizers belonging to the group, thereby allowing vulcanization of the raw tire without any trouble.

Furthermore, according to the tire vulcanizing method of the present invention, in the temperature-boosting process, when the temperature of the condensed water is low due to a low temperature of the saturated steam, which may possibly hinder the progress of vulcanization, the saturated steam is heated to generate overheated steam. With this, it is possible to supplement the lack of capabilities of the small-sized boiler and cause vulcanization to smoothly proceed.

DESCRIPTION OF EMBODIMENTS

The present invention will now be described in detail based on embodiments shown in the accompanying drawings.

Figure 6:
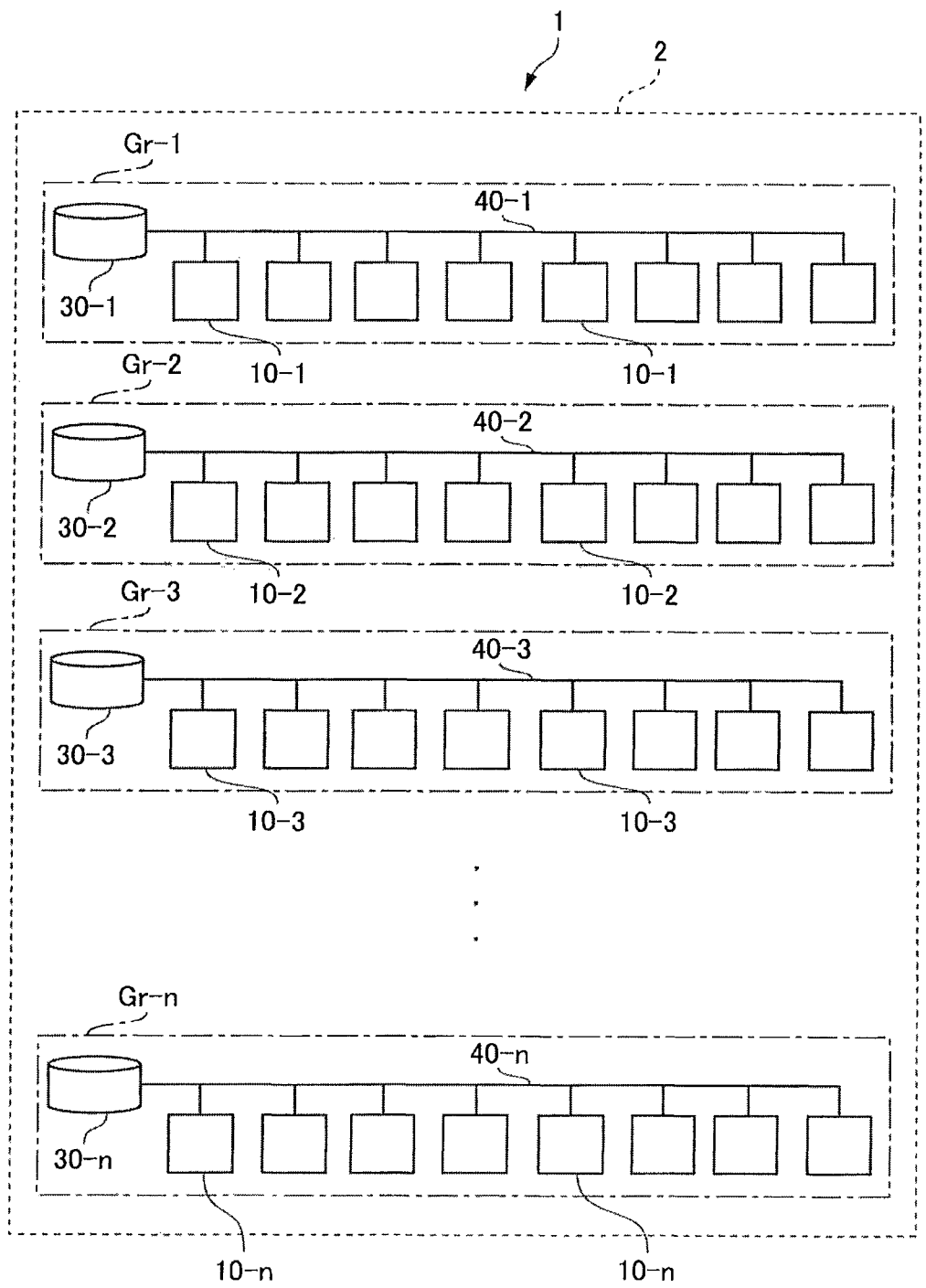
FIG. 6 is a diagram showing an example of a distributed-type vulcanizing system in the present embodiments.

First, a schematic structure of a vulcanizing system 1 in the present embodiments is described based on FIG. 6.

In the vulcanizing system 1, a plurality of (for example, fifty to hundred) vulcanizers 10-1 to 10-n are placed in an industry building 2. The vulcanizers 10-1 to 10-n are classified into n groups Gr-1 to Gr-n for every six to ten vulcanizers. The vulcanizing system 1 is provided with boilers 30-1 to 30-n corresponding to the number of groups Gr-1 to Gr-n. The boilers 30-1 to 30-n supply steam for the groups Gr-1 to Gr-n, respectively. The boilers 30-1 to 30-n allocated to the groups Gr-1 to Gr-n and the vulcanizers 10-1 to 10-n to which steam is supplied from the boilers 30-1 to 30-n are connected via steam supply paths 40-1 to 40-n, respectively. Steam generated in the boilers 30-1 to 30-n passes through the steam supply paths 40-1 to 40-n to their corresponding vulcanizers 10-1 to 10-n, respectively. The steam supply paths 40-1 to 40-n are each configured of a general piping member.

Four embodiments applied to the structure of each of the groups Gr-1 to Gr-n are sequentially described below. Note that, in the vulcanizing system 1, the vulcanizers 10-1 to 10-n, the boilers 30-1 to 30-n, and steam supply paths 40-1 to 40-n have the same specifications for use, and therefore typical reference numerals, such as a vulcanizer 10, a boiler 30, and a steam supply path 40, may be used in the following description. As a matter of course, it goes without saying that they do not restrict the vulcanizing system of the present invention.

First Embodiment

Figure 1:
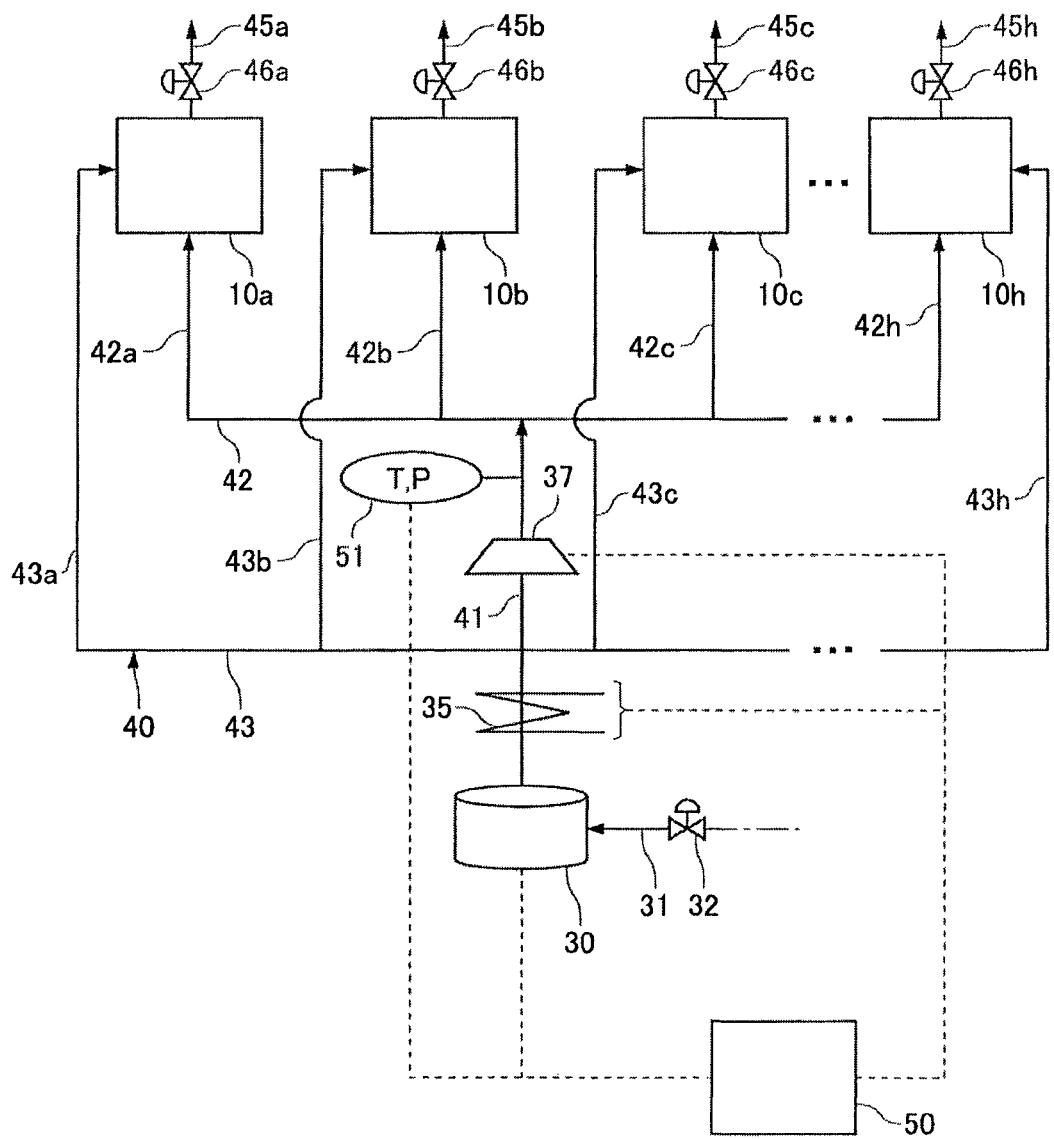
FIG. 1 is a block diagram of the structure of each group of a vulcanizing system in a first embodiment.

As shown in FIG. 1, the groups Gr-1 to Gr-n each include six to ten vulcanizers 10a to 10h. To the vulcanizers 10a to 10h, steam is supplied from the boiler 30. To the boiler 30, a water supply path 31 for supplying water to the boiler 3 from a supply source not shown is connected, and an amount of water adjusted by a valve 32 provided on the water supply path 31 is supplied to the boiler 30. The boiler 30 and the vulcanizers 10a to 10h are connected via the steam supply path 40 through which steam generated in the boiler 30 passes. On the steam supply path 40, a temperature booster 35 and a pressure booster 37 are provided. The temperature booster 35 and the pressure booster 37 boost the temperature and pressure of the steam generated in the boiler 30. These increases in temperature and pressure is to make the temperature and pressure to those required for vulcanization of a raw tire. The same goes for the following. Also, to the steam supply path 40, a sensor 51 detecting a temperature (T11) and a pressure (P1) of steam flowing through the steam supply path 40 is provided. A controller 50 successively obtains the temperature (T11) and the pressure (P1) detected by the sensor 51. The controller 50 controls the operations of the boiler 30, the temperature booster 35, and the pressure booster 37 according to the obtained temperature (T11) and pressure (P1).

<Vulcanizer 10>

The vulcanizer 10 (10a to 10h) is to vulcanize a raw tire by using steam.

Figure 5:
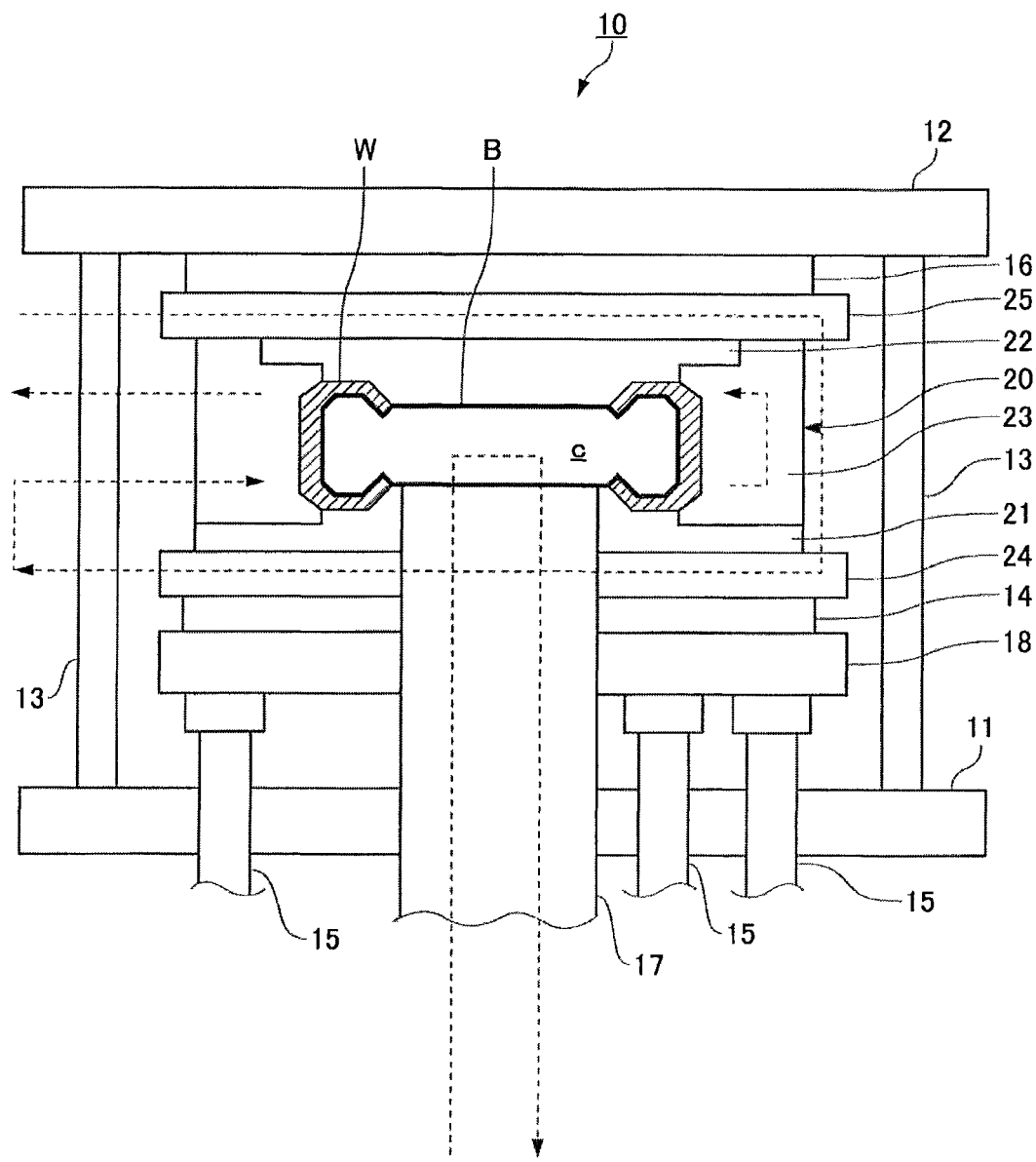
FIG. 5 is a sectional view of a main structure of a vulcanizer to be applied to the vulcanizing systems in the first to fourth embodiments.

As shown in FIG. 5, the vulcanizer 10 includes a base 11 and a bolster plate 12 placed so as to face the base 11 with a space. The bolster plate 12 is supported by a column 13 standing on the base 11.

Between the base 11 and the bolster plate 12, a mold 20 is placed that forms a cavity C to be filled with a raw tire W. The mold 20 includes a lower metal mold 21, an upper metal mold 22 placed above the lower metal mold 21, and a tread mold 23 placed between the lower metal mold 21 and the upper metal mold 22 to mold a tread of the (raw) tire W. The tread mold 23 is configured of a plurality of segments divided in a circumferential direction. The lower metal mold 21, the upper metal mold 22, and the tread mold 23 are combined together to form the cavity C. The mold 20 further includes a bottom platen 24 and a bolster platen 25. The bottom platen 24 is in contact with and fixed to the lower surface of the lower metal mold 21, and the bolster platen 25 is in contact with and fixed to the upper surface of the upper metal mold 22.

The bottom platen 24 is supported by a bottom plate 18 that can go up and down by a hydraulic cylinder 15 via a bottom insulator 14. Also, the bolster platen 25 is fixed to a bolster plate 12 via a bolster insulator 16. By operating the hydraulic cylinder 15 and a center mechanism 17, the space between the lower metal mold 21 and the upper metal mold 22 is caused to be in an open state, thereby filling the cavity C with the raw tire W to be vulcanized. In the cavity C, a bladder B is placed to which steam for molding and vulcanizing the raw tire W from inside.

To the bladder B, although details are omitted, steam is supplied through the center mechanism 17. To the center mechanism 17 of the vulcanizer 10, steam is supplied from a first branch supply path 42 (42a to 42h), which will be described further below. The steam to be supplied into the bladder B is assumed to have a temperature of approximately 150° C. to 200° C. and a pressure of approximately 1.5 MPa to 2.0 MPa.

Steam is supplied also into the mold 20. A route in the mold 20 is formed so that steam flows through the bolster platen 25, the bottom platen 24, and then the tread mold 23 in this order. To the bolster platen 25, steam is supplied from a second branch supply path 43 (43a to 43h), which will be described further below. As with the steam to be supplied into the bladder B, the steam to be supplied into the mold 20 is assumed to have a temperature of approximately 150° C. to 200° C., its pressure can be lower than approximately 1.5 MPa to 2.0 MPa.

The steam supplied to the bladder B and the mold 20 becomes a drain, which is discharged from the vulcanizer 10 to a discharge piping 45 (45a to 45h).

<Boiler 30>

As the boiler 30, a small-size one with small capabilities is used. This is because the boiler 30 is placed near the vulcanizers 10a to 10h. As this small-sized boiler 30, for example, a boiler capable of heating up to a steam temperature of approximately 100° C. with a pressure equal to or lower than 0.1 MPa and a heating area equal to or smaller than 10 m² can be used. According to the number of corresponding vulcanizers, the specific capabilities can be set. Steam (saturated steam) generated by this small-sized boiler 30 satisfies neither a vulcanization target temperature nor a vulcanization target pressure.

<Steam Supply Path 40>

As shown in FIG. 1, the steam supply path 40 connecting the boiler 30 and the vulcanizers 10a to 10h is configured of a main supply path 41 which is directly connected to the boiler 30, a first branch supply path 42 and a second branch path 43 branched from the main supply path 41 toward the vulcanizers 10a to 10h. Here, the temperature booster 35 and the pressure booster 37 are provided on the main supply path 41. When the boiler 30 is taken as being on an upstream of the steam supply path 40, the temperature booster 35 and the pressure booster 37 are sequentially arranged from the upstream side.

A heating means of the temperature booster 35 provided on the main supply path 41 is any, and various temperature-boosting means can be used, such as heating by an electric heater and heating by a flame burner. Also as for the pressure booster 37, no specific means is required, and various pressure-boosting means can be used, such as a plunger pump, a turbine, and a compressor.

The first branch supply path 42 is branched from a part of the main supply path 41 which is located on a downstream side with respect to the pressure booster 37, to first branch supply paths 42a to 42h. The first branch supply paths 42a to 42h are connected to the corresponding vulcanizers 10a to 10h to supply steam to the bladder B of the respective vulcanizers 10a to 10h. This steam passes through the temperature booster 35 and the pressure booster 37 to be temperature-boosted and pressure-boosted.

The second branch supply path (mold-destined supply path) 43 is branched from the main supply path 41 to second branch supply paths 43a to 43h between the temperature booster 35 and the pressure booster 37. The second branch supply paths 43a to 43h are connected to the corresponding vulcanizers 10a to 10h to supply steam to the mold 20 of the respective vulcanizers 10a to 10h. This steam passes through the temperature booster 35 but bypasses the pressure booster 37, and therefore is only temperature-boosted.

<Controller 50>

The controller 50 retains temperature information Td and pressure information Pd of steam to be supplied into the bladder B and the mold 20 for vulcanization of the raw tire W. The temperature information Td and the pressure information Pd are set as appropriate in the controller 50 according to the specifications of the size and material of the raw tire W to be vulcanized and others. Also, the controller 50 retains boiler capability information Cd regarding the temperature and pressure of steam to be generated in the boiler 30.

The controller 50 derives each operating condition of the temperature booster 35 and the pressure booster 37 from the set temperature information Td and pressure information Pd and the boiler capability information Cd to start the operations of the boiler 30, the temperature booster 35, and the pressure booster 37 based on these operating conditions.

Also, the controller 50 compares the temperature (T11) and the pressure (P1) obtained from the sensor 51 with the temperature information Td and the pressure information Pd. When the obtained temperature (T11) and pressure (P1) are different from the temperature information Td and the pressure information Pd, respectively, the controller 50 controls the operating conditions of the temperature booster 35 and the pressure booster 37 and, further as required, the boiler 30, based on conditions corresponding to the difference.

The operation of the vulcanizing system 10 described below is performed under the control of the controller 50 in the manner as described above.

<Operation of Vulcanizing System 10>

Meanwhile, to vulcanize the raw tire W in the vulcanizing system 1, steam generated in the boiler 30 is discharged toward the main supply path 41. Since the boiler 30 is of a small size, the discharged steam has a temperature of approximately 100° C., and its pressure in this case is approximately 0.1 MPa. Since both of the temperature and the pressure are not sufficient as they are as steam to be supplied into the bladder B, the heating is conducted by the temperature booster 35 to approximately 150° C. to 200° C., and further the pressure is boosted by the pressure booster 37 to 1.5 MPa to 2.0 MPa.

The steam with the temperature and pressure boosted by the temperature booster 35 and the pressure booster 37 is branched by the first branch supply paths 42a to 42h from the main supply path 41, and is then supplied to each of the vulcanizers 10a to 10h. In the bladder B included each of the vulcanizers 10a to 10h, this steam heats and pressures the raw tire W from inside via the bladder B.

Part of the steam with its temperature boosted in the temperature booster 35 is branched by the second branch supply paths 43a to 43h, and is then supplied to each of the vulcanizers 10a to 10h. This steam is supplied into the mold 20 included in each of the vulcanizers 10a to 10h to heat the raw tire W from outside.

As described above, by supplying steam to each of the bladder B and the mold 20, the raw tire W is heated and vulcanized. The steam is supplied toward the bladder B and the mold 20 until vulcanization of the raw tire W is completed.

As described above, in the vulcanizing system 1, the plurality of vulcanizers 10-1 to 10-$n$ which are placed in the industry building 2 are classified into groups Gr-1 to Gr-n, and the boilers 30-1 to 30-$n$ are allocated to the groups Gr-1 to Gr-n. Therefore, the piping length between the boilers 30-1 to 30-$n$ and the vulcanizers 10-1 to 10-$n$ can be shortened, and thus piping heat dissipation can be decreased. Also, in the vulcanizing system 1, the temperature booster 35 and the pressure booster 37 are provided in the respective groups Gr-1 to Gr-n to supplement the lack of capabilities of the boilers 30-1 to 30-n, thereby establishing a distributed-type vulcanizing system 10. In the distributed-type vulcanizing system, since the number of vulcanizers 10 to be allocated to one boiler 30 is small, it is easy to control the temperature and pressure of each vulcanizer 10.

The vulcanizing system 1 supplies steam to be supplied to the mold 20 of each of the vulcanizers 10a to 10h via the second branch supply paths 43a to 43h bypassing the pressure booster 37. Therefore, the load on the pressure booster 37 is decreased as steam not required to be pressure-boosted is not processed in the pressure booster 37, thereby achieving energy saving.

In the embodiment described above, for the sake of convenience of branching the second branch supply paths 43a to 43h before the pressure booster 37, the temperature booster 35 and then the pressure booster 37 are placed in this order from the upstream side. However, in the present invention, branching the second branch supply paths 43a to 43h before the pressure booster 37 is not imperative. Therefore, the pressure booster 37 and then the temperature booster 35 can be placed in this order from the upstream side.

Also, while the mold 20 in the embodiment described above is configured of the lower metal mold 21, the upper metal mold 22, the tread mold 23, the bottom platen 24, and the bolster platen 25, the mold of the present invention is not restricted to this. For example, a portion corresponding to the tread mold 23 may be provided to each of the lower metal mold 21 and the upper metal mold 22, and a mold without having a platen can also be used.

Furthermore, by providing a valve to each of the first branch supply paths 42a to 42h and the second branch supply paths 43a to 43h, independent vulcanization of the vulcanizers 10a to 10h can be achieved.

Second Embodiment

Figure 2:
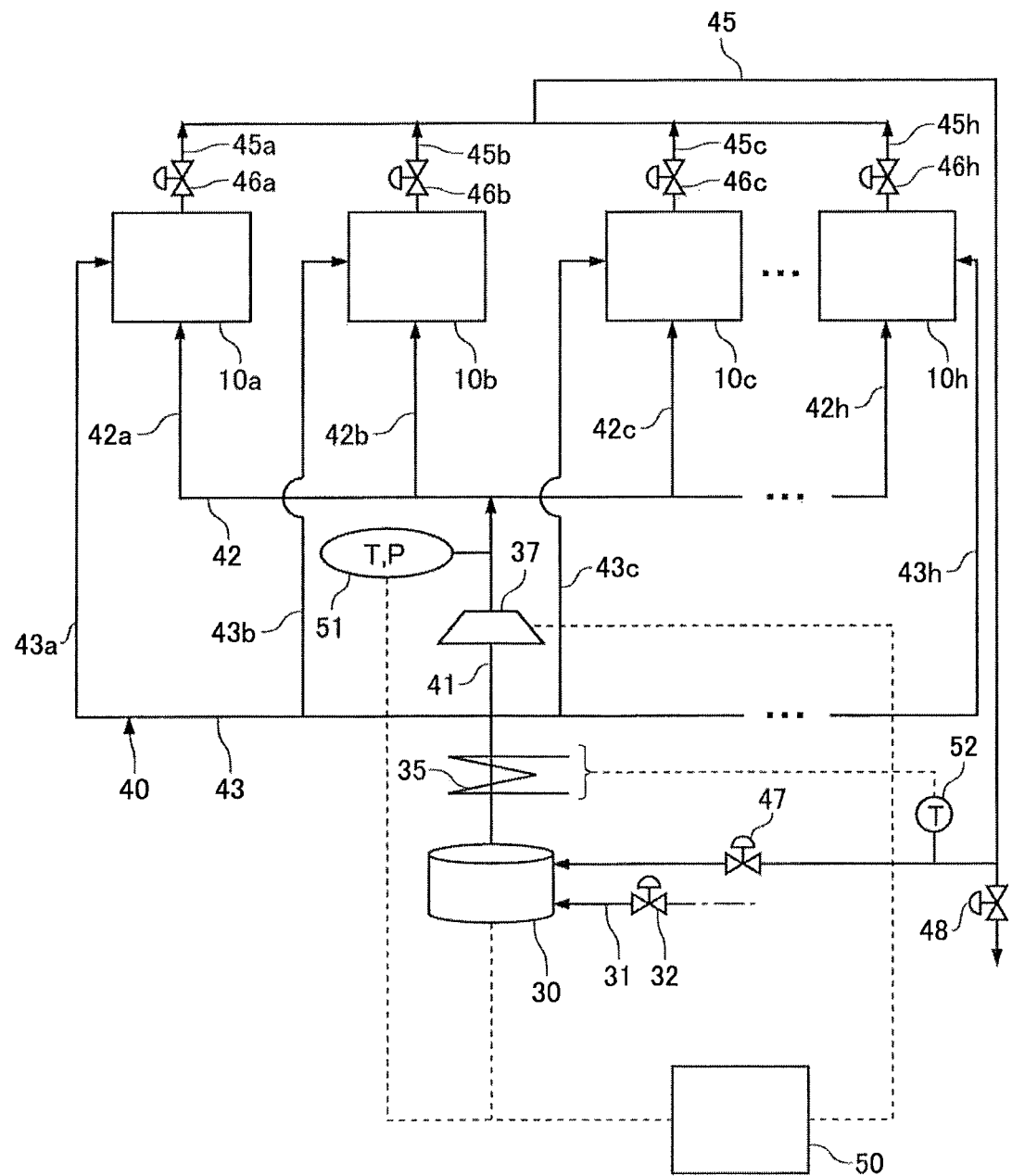
FIG. 2 is a block diagram of the structure of each group of a vulcanizing system in a second embodiment.

A second embodiment according to the present invention is described based on FIG. 2. Note that components identical to those in the first embodiment are provided with the same reference character as that of FIG. 1 and are not described herein.

In the second embodiment, discharge piping 45a to 45h connected to the vulcanizers 10a to 10h, respectively, are collected to one end of a circular piping 45. The other end of the circular piping 45 is connected to the boiler 30. Also, the circular piping 45 includes a valve 48 for discharging a drain to the outside of the system.

A drain occurring in each of the vulcanizers 10a to 10h is returned to the boiler 30 via the circular piping 45. The drain to be returned to the boiler 30 has a temperature equal to or higher than 100° C. Therefore, if the drain is supplied to the boiler 30 in addition to water supplied from the water supply path 31, the operation capabilities of the boiler 30 for obtaining steam at a predetermine temperature can be decreased, and therefore it is possible to contribute to energy saving.

In the second embodiment, a sensor 52 detecting the temperature (T21) of the drain is provided on the circular piping 45, and the controller 50 obtains the temperature (T21) of the drain from the sensor 52. The controller 50 derives the operating conditions of each of the temperature booster 35 and the pressure booster 37 from the temperature (T21) of the drain, the set temperature information Td and pressure information Pd, and the boiler capability information Cd, and controls the operations of the boiler 30, the temperature booster 35, and the pressure booster 37 based on these operating conditions. Here, the controller 50 can control the degree of opening of the valve 32 provided on the water supply path 31 and the degree of opening of a valve 47 provided on the circular piping 45 to adjust the amounts of water and the drain to be supplied to the boiler 30.

Also, the controller 50 compares the temperature (T11) and pressure (P1) obtained from the sensor 51 and the temperature (T21) of the drain obtained from the sensor 52 with the temperature information Td and the pressure information Pd. Based on the comparison results, the controller 50 controls the operating conditions of the temperature booster 35 and the pressure booster 37 and, furthermore as required, the boiler 30. Furthermore, the controller 50 can control the degree of opening of valves 46a to 46h on the discharge pipings 45a to 45h to adjust the discharge of the drain to the circular piping 45.

While a drain is collected from all of the vulcanizers 10a to 10h in the embodiment described above, the present invention is not restricted to this as long as an amount required for circulating can be ensured.

Third Embodiment

Figure 3:
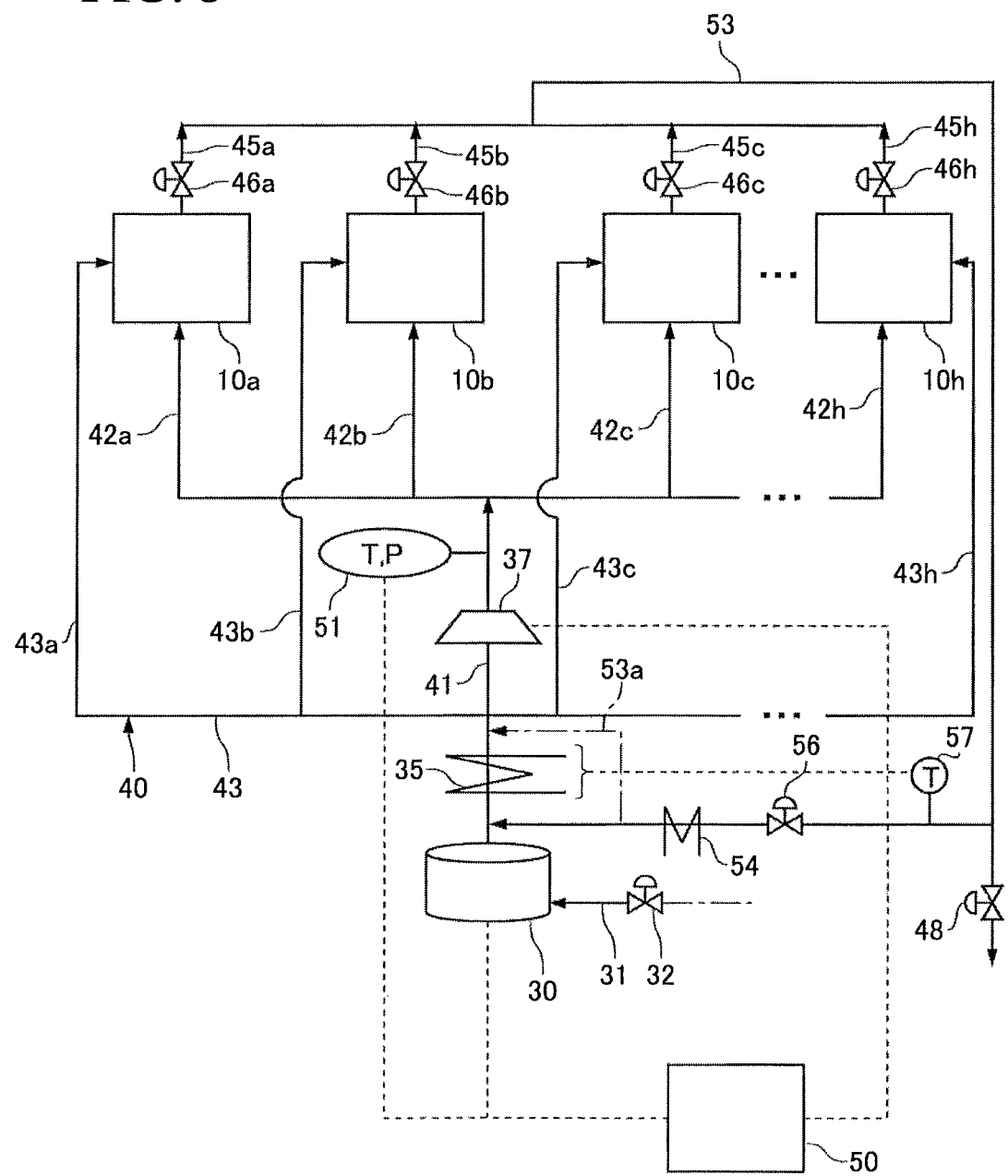
FIG. 3 is a block diagram of the structure of each group of a vulcanizing system in a third embodiment.

A third embodiment according to the present invention is described based on FIG. 3. Note that components identical to those in the first and second embodiments are provided with the same reference character as that of FIG. 1 and FIG. 2 and are not described herein.

In the third embodiment, the discharge pipings 45a to 45h connected to the vulcanizers 10a to 10h, respectively, are collected to one end of a circular piping 53. The other end of the circular piping 53 is connected to the main supply path 41. That is, the third embodiment is different from the second embodiment in the destination to which a drain is returned.

The circular piping 53 is provided with a temperature booster 54. A drain flowing through the circular piping 53 can be temperature-boosted by the temperature booster 54 to become steam. This steam is supplied to the main supply path 41, and is further temperature-boosted by the temperature booster 35 provided on the main supply path 41. A part of the steam passing through the temperature booster 35 flows through the main supply path 41 as it is, and the other part is supplied to the second branch supply path 43. The steam flowing through the main supply path 41 as it is passes through the first branch supply path 42 after being pressure-boosted by the pressure booster 37 to be supplied into the bladder B of each of the vulcanizers 10a to 10h. The steam supplied to the second branch supply path 43 serves to heat the mold 20 of each of the vulcanizers 10a to 10h.

Also in the third embodiment, a sensor 57 detecting a temperature (T31) of the drain is provided on the circular piping 53, and the controller 50 can refer to the temperature (T31) of the drain to control the operations of the boiler 30, the temperature booster 35, the pressure booster 37, the temperature booster 54, and a valve 56.

As described above, in the third embodiment, by providing the temperature booster 54 on the circular piping 53 and heating the drain there, the load on the boiler 30 is decreased and energy saving of the vulcanizing system 1 is improved.

In the embodiment described above, while the other end of the circular piping 53 is connected to the main supply path 41 between the boiler 30 and the temperature booster 35, the temperature booster 35 of the main supply path 41 can be bypassed by providing a bypass path 53a indicated by a one-dot-chain line in FIG. 3 and connecting it to the main supply path 41 between the temperature booster 35 and the pressure booster 37. This is because there is no need to let the flow pass through the temperature booster 35 of the main supply pipe 41 as long as the temperature can be boosted by the temperature booster 54 of the circular piping 53 to a temperature required for vulcanization. With this, waste of energy consumed at the temperature booster 35 of the main supply pipe 41 can be omitted.

Fourth Embodiment

Figure 4:
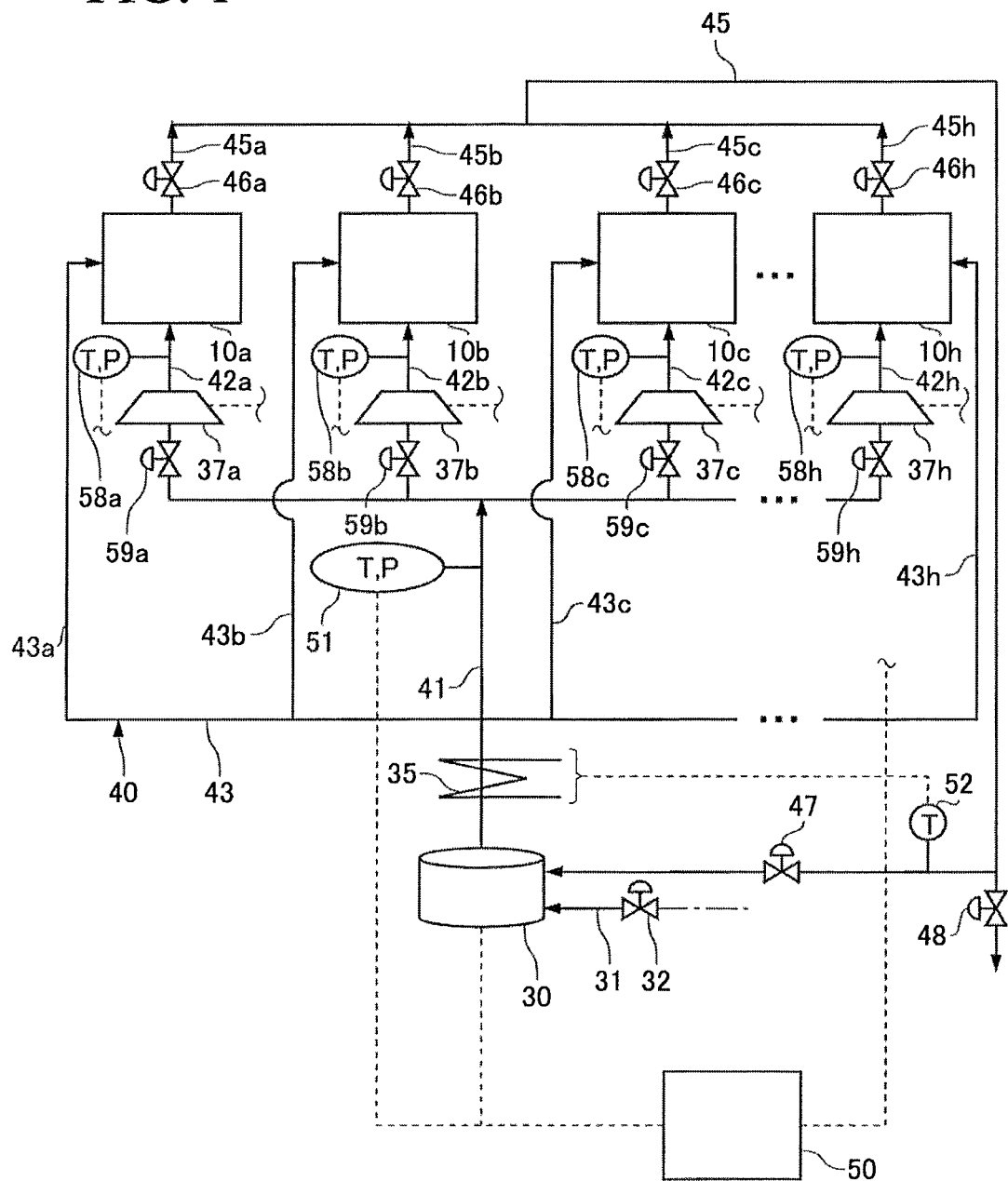
FIG. 4 is a block diagram of the structure of each group of a vulcanizing system in a fourth embodiment.

A fourth embodiment according to the present invention is described based on FIG. 4. Note that components identical to those in the first to third embodiments are provided with the same reference character as that of FIGS. 1 to 3 and are not described herein.

In the fourth embodiment, the pressure booster 37 provided to the main supply path 41 in the first to third embodiments is abolished, and pressure boosters 37a to 37h are provided to the first branch supply paths 42a to 42h, respectively. On a downstream side of the pressure boosters 37a to 37h on the first branch supply paths 42a to 42h, sensors 58a to 58h are provided, respectively, that detect a temperature (T4) and a pressure (P4) of steam flowing through the first branch supply paths 42a to 42h. Also, on an upstream side of the pressure boosters 37a to 37h on the first branch supply paths 42a to 42h, valves 59a to 59h are provided, respectively, that adjust the flow rate of steam flowing through the first branch supply paths 42a to 42h.

In the fourth embodiment, steam temperature-boosted by the temperature booster 35 partially flows through the main supply path 41 as it is to be branched to the first branch supply paths 42a to 42h for supply. This steam is pressure-boosted by the pressure boosters 37a to 37h provided on the first branch supply paths 42a to 42h to a desired pressure, and is then supplied into the bladder B of each of the vulcanizers 10a to 10h.

In the fourth embodiment, the temperature (T4) and the pressure (P4) of the steam flowing through the first branch supply paths 42a to 42h are detected by the sensors 58a to 58h, and the controller 50 can also refer to the temperature (T4) and the pressure (P4) to control the operations of the boiler 30, the temperature booster 35, the pressure boosters 37a to 37h, and the valves 59a to 59h.

As described above, since the pressure booster 37a to 37h are provided on the first branch supply paths 42a to 42h in the fourth embodiment, steam under conditions suitable for each of the vulcanizers 10a to 10h can be supplied. This may lead to a decrease in wasteful consumption of energy.

In the embodiment described above, the temperature booster 35 is provided on the main supply path 41, and the pressure boosters 37a to 37h are provided on the first branch supply paths 42a to 42h, respectively. However, in the present invention, the positions of the temperature booster and the pressure booster are not restricted to them as long as they are provided on the steam supply path 40 formed of the main supply path 41 and the first branch supply paths 42a to 42h. The present invention includes at least the following forms. Also, the temperature booster can be provided on the second branch path. Note that ○ means that the relevant component is present and x means that the relevant component is absent.

Main supply path: temperature booster ○, pressure booster ○

First branch supply path: temperature booster x, pressure booster x

First to Third Embodiments

Main supply path: temperature booster x, pressure booster x

First branch supply path: temperature booster ○, pressure booster ○;

Main supply path: temperature booster ○, pressure booster ○

First branch supply path: temperature booster ○, pressure booster ○;

Main supply path: temperature booster ○, pressure booster x

First branch supply path: temperature booster x, pressure booster ○;

Fourth Embodiment

Main supply path: temperature booster x, pressure booster ○

First branch supply path: temperature booster ○, pressure booster x

Fifth Embodiment

As a fifth embodiment, a tire vulcanizing system 100 including one vulcanizer 10 and one boiler 30 is described. It goes without saying that this system can be made as a system assumed as a distributed-type vulcanizing system in which one boiler is connected to a plurality of vulcanizers.

Figure 7:
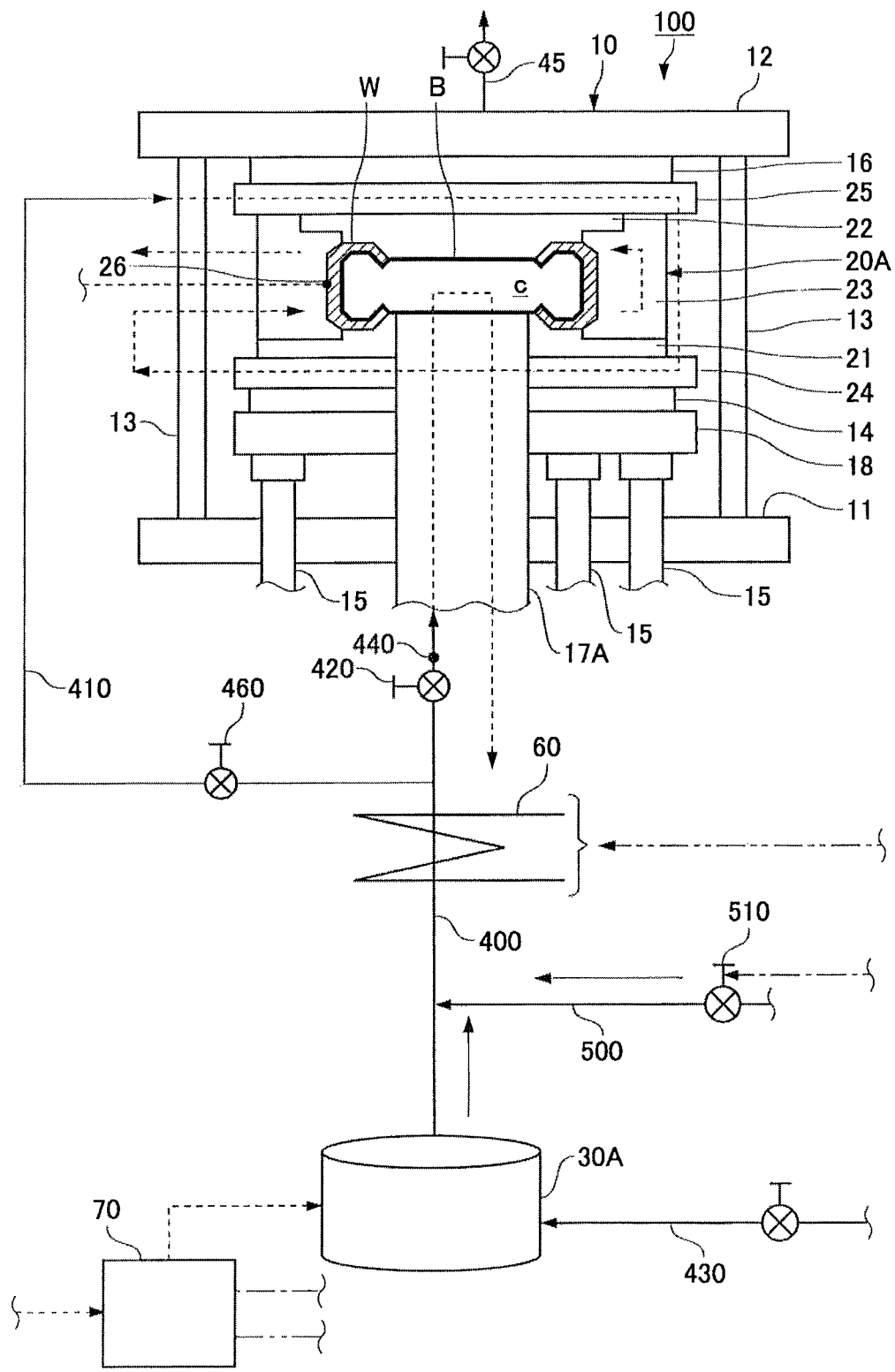
FIG. 7 is a block diagram of the structure of a vulcanizing system in a fifth embodiment.

The tire vulcanizing system 100 according to the present embodiment includes, as shown in FIG. 7, the vulcanizer 10, a boiler 30A generating saturated steam, a first supply path 400 for letting the saturated steam generated in the boiler 30A flow toward the bladder B of the vulcanizer 10, a second supply path 410 branched from the first supply path 400 for letting the saturated steam generated in the boiler 30A flow toward the bottom platen 24 and the bolster platen 25 of the vulcanizer 10, a gas supply path 500 connected to the first supply path 400, and a first heater 60 increasing the temperature of a fluid flowing through the first supply path 400.

The tire vulcanizing system 100 includes a control unit 70. With an instruction from the control unit 70, the amount of steam (saturated steam) to be supplied from the boiler 30A toward the vulcanizer 10, the amount of nitrogen gas to be supplied from the gas supply path 500 toward the vulcanizer 10, and the output of the first heater 60 are controlled.

Note that while nitrogen gas is taken as an example of a pressurizing medium in the following, it goes without saying that any of noncondensable other gases (such as inert gas and air) can also be used.

The structure of the vulcanizer 10 in the fifth embodiment is identical to the vulcanizer 10 in the first embodiment. Therefore, the components are provided with the same reference characters as those in FIG. 1 and are not described herein.

Into the bladder B, although details are omitted, a vulcanization medium (steam and nitrogen gas) passing through a center mechanism 17A is supplied. The center mechanism 17A of the vulcanizer 10 is supplied with the vulcanization medium from the first supply path 400. Note that while only steam may be provided at the start of vulcanization, this steam only can configure a vulcanization medium.

The vulcanization medium is supplied also into a mold 20A. A route in the mold 20A is, for example, formed so that the vulcanization medium flows through the bolster platen 25, the bottom platen 24, and then the tread mold 23 in this order.

The bolster platen 25 is supplied with the vulcanization medium from the second supply path 410, which will be described later.

Steam in the vulcanization medium supplied to the bladder B and the mold 20A becomes condensed water, which is discharged from the vulcanizer 10 to the discharge piping 45.

The mold 20A includes a temperature sensor 26 measuring the temperature of the raw tire W in the vulcanization process. A temperature T measured by the temperature sensor 26 is sent to the control unit 70. Note that measurement of the temperature of the raw tire W by using the temperature sensor 26 is not restricted to direct measurement of the temperature of the raw tire W but also includes indirect measurement. The reason is that what is required here is not an absolutely accurate temperature of the raw tire W.

<Boiler 30A>

As the boiler 30A, a small-sized one with small capabilities is assumed to be used. This is because the boiler 30A is placed near the vulcanizer 10. When this boiler is applied to a distributed-type vulcanizing system, specific capabilities can be set according to the number of corresponding vulcanizers 10. Steam (saturated steam) generated from this small-sized boiler 30A satisfies neither a vulcanization target temperature nor vulcanization target pressure. Therefore, the tire vulcanizing system 100 includes component for supplementing the temperature and pressure.

The boiler 30A is supplied with water from a supply source not shown via a water piping 430.

<First Supply Path 400 and Second Supply Path 410>

As shown in FIG. 7, the vulcanizer 10 and the boiler 30A are connected via the first supply path 400, and steam generated by the boiler 30A passes through the first supply path 400 to be supplied into the bladder B of the vulcanizer 10. The first supply path 400 is provided with a valve 420, the amount of the vulcanization medium including steam and nitrogen gas to be supplied to the vulcanizer 10 can be adjusted. Also, the first supply path 400 is provided with a pressure sensor 440, measuring the pressure inside the raw tire W via the first supply path 400 in the vulcanization process. The measured pressure is sent as tire inside information P to the control unit 70. In place of the pressure sensor 440, a temperature sensor may be provided, and the measured temperature can be taken as the tire inside information P.

A gas supply path 500 is connected to the first supply path 400, and nitrogen gas supplied from a supply source not shown passes through the gas supply path 500 to flow into the first supply path 400. The gas supply path 500 is provided with a gas flow rate adjustment valve 510 adjusting the amount of nitrogen gas flowing into the first supply path 400. When the gas flow rate adjustment valve 510 is closed, nitrogen gas is inhibited from flowing into the first supply path 400. The flow rate of nitrogen gas is controlled with the degree of opening of a gas flow rate adjustment valve 510 based on an instruction from the control unit 70.

When the boiler 30A is taken as being on the most upstream of the first supply path 400, the first heater 60 is provided on a part of the first supply path 400 which is located on a downstream side with respect to a connecting position of the gas supply path 500. The first heater 60 boosts the temperature of steam flowing through the first supply path 400 or the vulcanization medium including steam and nitrogen gas based on an instruction from the control unit 70. As the first heater 60, various temperature-boosting means can be used, such as an electric heater and a flame burner.

The second supply path 410 is branched from a part of the first supply path 400 which is located on a downstream side with respect to the first heater 60. The second supply path 410 supplies the vulcanization medium to the mold 20A of the vulcanizer 10. The second supply path 410 is provided with a valve 460, adjusting the amount of steam or the vulcanization medium including steam and nitrogen gas to supply the vulcanizer 10.

<Control Unit 70>

Based on the tire temperature T, the control unit 70 instructs the boiler 30A of the amount of generation of steam so that the flow rate of steam (saturated steam) to be supplied from the boiler 30A toward the vulcanizer 10 is adjusted. That is, when the temperature T is low, the flow rate of steam is increased to boost the temperature of the raw tire W. When the temperature T is high, the flow rate of steam is decreased to decrease the temperature of the raw tire W. With this, the vulcanization temperature is optimized to improve the quality of a tire to be produced and also improve productivity.

Also, based on the tire temperature T, the control unit 70 instructs the gas flow rate adjustment valve 510 of its degree of opening so that the flow rate of nitrogen gas to be supplied from the gas supply path 500 toward the vulcanizer 10 is adjusted. That is, when the temperature T is low, the flow rate of nitrogen gas is decreased to boost the temperature of the raw tire W. When the temperature T is high, the flow rate of nitrogen gas is increased to decrease the temperature of the raw tire W. With this, the vulcanization temperature is optimized to improve the quality of a tire to be produced and also improve productivity.

Based on the tire inside information P, the control unit 70 instructs the gas flow rate adjustment valve 510 of its degree of opening so that the flow rate of nitrogen gas to be supplied from the gas supply path 500 toward the vulcanizer 10 is adjusted. Note that in the present embodiment, pressure and temperature control is not a characteristic portion, and therefore specific description is omitted.

<Operation of Tire Vulcanizing System 100>

Meanwhile, the gist of the control when the raw tire W is vulcanized in the tire vulcanizing system 100 is shown as follows according to the progress of vulcanization.

(a) Initial Vulcanization

In initial vulcanization, for the purpose of boosting the temperature of the raw tire W, only saturated steam generated by the boiler 30A is supplied as it is. Therefore, the gas flow rate adjustment valve 510 provided on the gas supply path 500 is closed. Note that the raw tire W before the start of vulcanization is at ambient temperature (which is referred to as T0).

(b) When the tire temperature T becomes equal to or higher than a saturated steam temperature (for example, 150° C.)

For the purpose of boosting the temperature of the raw tire W to a vulcanization target temperature, saturated steam generated by the boiler 30A is temperature-boosted by the first heater 60 to generate overheated steam. When the temperature of the steam to be supplied to the vulcanizer 10 is boosted to, for example, a temperature equal to or higher than 200° C., condensed water occurring in the bladder B can be kept at high temperature. Therefore, a decrease in temperature of the raw tire W due to condensed water can be prevented.

(c) Introduction of Nitrogen Gas

In addition to increasing the temperature to the vulcanization target temperature, for the purpose of increasing the pressure in the raw tire W, nitrogen gas is further introduced to the first supply path 400 via the gas supply path 500.

Note that, prior to (b) above, the first heater 60 can be operated after nitrogen gas is introduced to the first supply path 400 via the gas supply path 500 (control (c)). Furthermore, the control (b) and the control (c) can be simultaneously started.

(d) When the tire temperature T becomes equal to or higher than the vulcanization target temperature (for example, 180° C.)

For the purpose of decreasing the too-high temperature of the raw tire W while keeping the internal pressure of the raw tire W, cooling control is performed. In the cooling control, a vulcanization medium including saturate steam and nitrogen gas is supplied to the vulcanizer 10. More specifically, by stopping the operation of the first heater 60 and switching the overheated steam to saturated steam for introduction, condensed water at a low temperature (for example, 150° C.) is caused to occur on purpose inside the vulcanizer 10 to cool the raw tire W.

Alternatively, the raw tire W can also be cooled by increasing the ratio of nitrogen gas to decrease heat transferability of the vulcanization medium to be supplied to the vulcanizer 10.

However, the tire temperature T becomes too lower than the vulcanization target temperature only with the cooling control. In this case, heating control is performed in which the vulcanization medium including overheated steam and nitrogen gas is supplied to the vulcanizer 10 to boost the temperature of the raw tire W while keeping the condensed water at high temperature.

That is, here, the cooling control and the heating control are selectively executed as required, thereby appropriately controlling the vulcanization conditions (the tire temperature and internal pressure).

Figure 8:
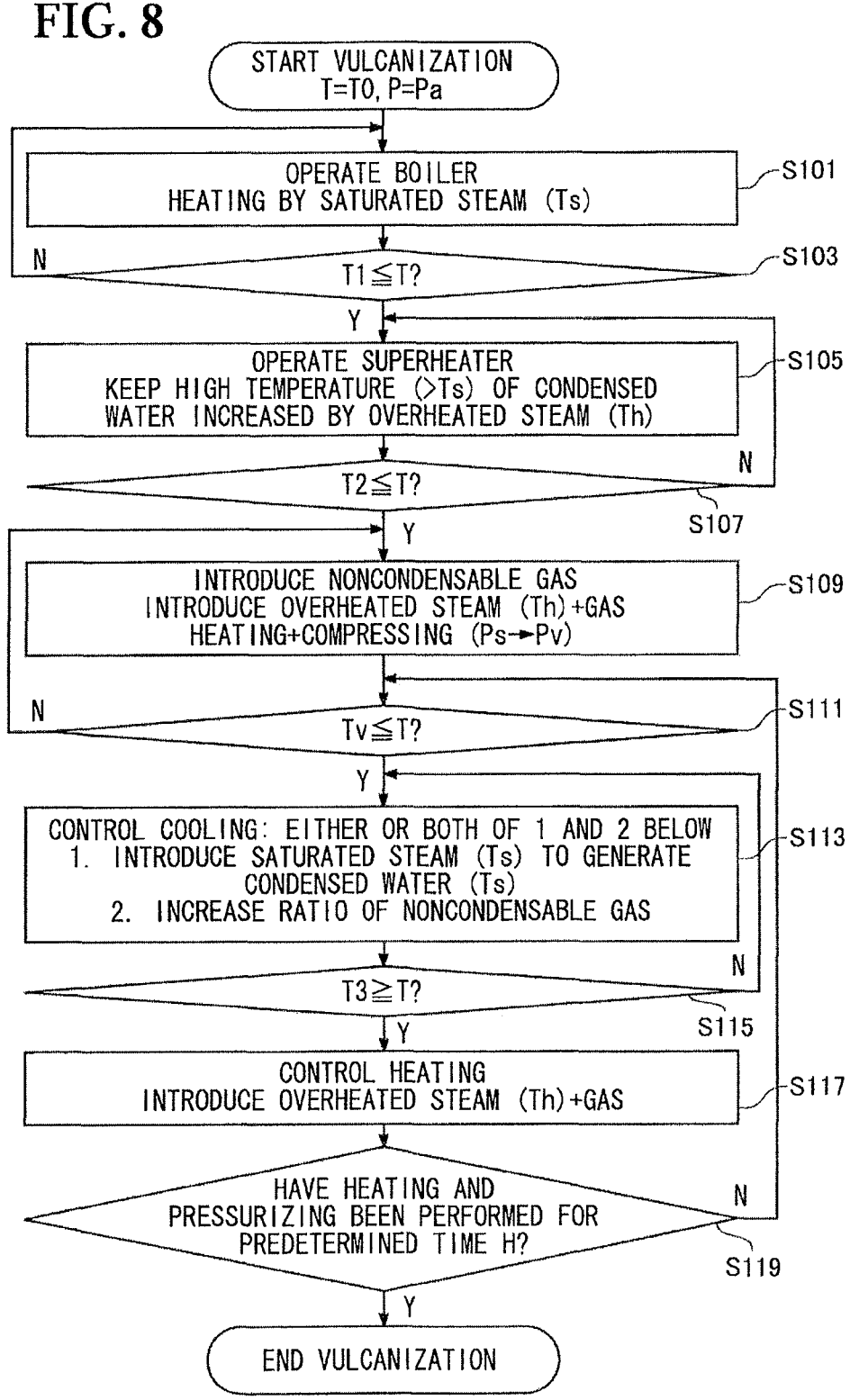
FIG. 8 is a flowchart of an example of a control procedure of the vulcanizing system in the fifth embodiment.
Figure 9:
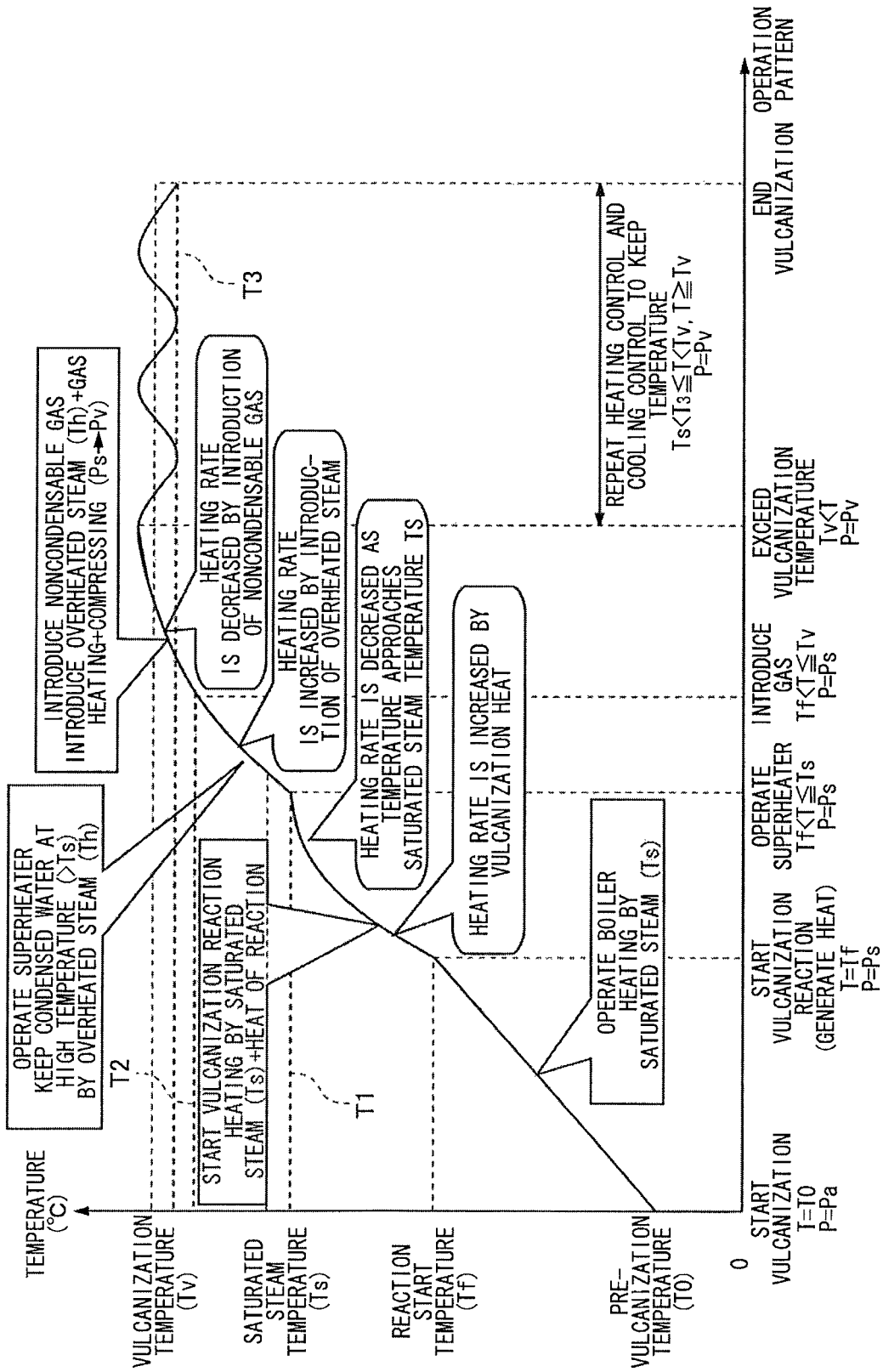
FIG. 9 is a diagram showing a tire's temperature behavior image according to the control procedure shown in FIG. 8.

Next, an example of a specific procedure of controlling the tire vulcanizing system 100 is shown with reference to FIG. 8 and FIG. 9. Note that signs regarding temperatures (° C.) and pressures (MPa) are defined as follows.

[Definition of Temperatures]
Tire temperature: T
Tire initial temperature before the start of vulcanization: T0 (for example, 25° C.)
Tire vulcanization reaction (heating) start temperature: Tf (for example, 120° C.)
Heating start temperature: T1 (Tf<T1<Ts)
Saturated steam temperature: Ts (>Tf) (depending on boiler capabilities; for example, Ts is 150° C.)
Gas introduction start temperature: T2 (Ts<T2<Tv)
Overheated saturated temperature: Th (>Tv; for example, Th is 250° C.)
Vulcanization target temperature: Tv (>Ts; for example, Tv is 180° C.)
From the above, T0<Tf<T1<Ts<T2<Tv<Th holds.

[Definition of Pressures]
Tire (bladder) internal pressure (total pressure): P
Atmospheric pressure: Pa (0.1 MPa)
Saturated steam pressure: Ps (>Pa) (depending on boiler capabilities; for example, Ps is 0.5 MPa)
Vulcanization target pressure: Pv (>Ps; for example, Pv is 2.0 MPa)
From the above, Pa<Ps<Pv holds.

Initially when vulcanization is started, only the boiler 30A is operated to supply saturated steam via the first supply path 400 and the second supply path 410 to the vulcanizer 10 (FIG. 8, S101). With the introduction of saturated steam, the temperature of the raw tire W is boosted toward the vulcanization reaction start temperature Tf.

Since vulcanization is an exothermic reaction, when the temperature reaches the vulcanization reaction start temperature Tf to start vulcanization, the heating rate of the raw tire W is increased as ever. However, as the temperature of the raw tire W approaches the saturated steam temperature Ts, the heating rate of the raw tire W is decreased. This tire internal pressure is increased to the saturated steam pressure Ps.

Based on the information sent from the temperature sensor 26, the control unit 70 determines whether the temperature T of the raw tire W reaches the heating start temperature T1 (FIG. 8, S103).

Then, if the raw tire W has reached the heating start temperature T1 (FIG. 8, Y in S103), the first heater 60 instructed by the control unit 70 starts to operate (FIG. 8, S105). With this, the vulcanizer 10 is supplied with overheated steam at the temperature Th in place of saturated steam. Therefore, the heating rate of the raw tire W is changed to be increased. Also, with the introduction of overheated steam, the condensed water can be kept at high temperature. Furthermore, the temperature Th of the overheated steam preferably exceeds the vulcanization target temperature Tv, but it goes without saying that the temperature is not increased to be a high temperature adversely affecting the quality of the tire.

If the raw tire W has not reached the heating start temperature T1 (FIG. 8, N in S103), the control unit 70 continues the instruction for supplying saturated steam to the vulcanizer 10.

The heating start temperature T1 is selected from those between the tire vulcanization reaction (heat generation) start temperature Tf and the saturated steam temperature Ts. Conceptually, heating preferably starts when the tire temperature approaches the saturated steam temperature Ts and the tire heating rate starts to decrease.

After the operation of the first heater 60 starts, the control unit 70 determines whether the temperature T of the raw tire W reaches the gas introduction start temperature T2 (FIG. 8, S107).

Then, if the raw tire has reached the gas introduction start temperature T2 (FIG. 8, Y in S107), the gas flow rate adjustment valve 510 instructed by the control unit 70 is opened to a predetermined degree of opening, thereby letting nitrogen gas introduced to the first supply path 400 (FIG. 8, S109). Then, the vulcanizer 10 is supplied with the vulcanization medium including overheated steam and nitrogen gas, and the tire internal pressure reaches the tire vulcanization target pressure Pv. However, with the introduction of nitrogen gas, the heating rate of the raw tire W is decreased.

If the raw tire W has not reached the gas introduction start temperature T2 (FIG. 8, N in S107), the control unit 70 continues the instruction for supplying only the overheated steam to the vulcanizer 10.

The gas introduction start temperature T2 is selected from temperatures between the saturated steam temperature Ts and the overheated steam temperature Th.

After introduction of nitrogen gas starts, the control unit 70 determines whether the temperature T of the raw tire W reaches the vulcanization target temperature Tv (FIG. 8, S111).

Then, if the raw tire W has reached the vulcanization target temperature Tv (FIG. 8, Y in S111), the control unit 70 executes cooling control (FIG. 8, S113). In the cooling control, with the first heater 60 instructed by the control unit 70 stopping operation, saturated steam is supplied together with nitrogen gas to the vulcanizer 10 in place of overheated steam so far. Alternatively, while overheated steam is kept as it is, the ratio of nitrogen gas is increased. In this case, the control unit 70 instructs the gas flow rate adjustment valve 510 to increase the degree of opening. As a matter of course, saturated steam may be supplied together with nitrogen gas to the vulcanizer 10 in place of overheated steam and also the ratio of nitrogen gas may be increased.

Until the raw tire W reaches the vulcanization target temperature Tv (FIG. 8, N in S111), the control unit 70 continues the introduction of the vulcanization medium including overheated steam and nitrogen gas.

Note that while the cooling control is performed when the raw tire W reaches the vulcanization target temperature Tv herein, a condition for starting the cooling control can be set such that the temperature reaches a predetermined temperature Tv' exceeding the vulcanization target temperature Tv or the temperature reaches a predetermined temperature Tv" lower than the vulcanization target temperature Tv. The temperatures Tv' and Tv" are temperatures defined with reference to the vulcanization target temperature in the present invention.

With the cooling control, the temperature in the raw tire W is decreased. The control unit 70 determines whether the temperature reaches the heating control start temperature T3 (FIG. 8, S115).

Then, if the temperature has reached the heating control start temperature T3 (FIG. 8, Y in S115), the control unit 70 executes heating control (FIG. 8, S117). The heating control start temperature T3 should be defined as appropriate with reference to the vulcanization target temperature Tv, for example, the vulcanization target temperature Tv (° C.)–5° C., preferably the vulcanization target temperature Tv (° C.)–2° C.

The heating control is selected according to details of the cooling control. That is, when the cooling control is to supply saturated steam together with nitrogen gas to the vulcanizer 10 in place of overheated steam, overheated steam is supplied together with nitrogen gas to the vulcanizer 10 in place of saturated steam. In this case, the control unit 70 instructs the first heater 60 to restart the operation. When the cooling control is to increase the ratio of nitrogen gas (overheated steam is as it is), the ratio of nitrogen gas is returned to the value before the increase. In this case, the control unit 70 instructs the gas flow rate adjustment valve 510 to return the degree of opening to the original.

While performing the controls described above, the control unit 70 determines whether the raw tire W has been heated and pressurized for a time H required for vulcanization (FIG. 8, S119). This time is determined with the time elapsed after the raw tire W has reached the vulcanization target temperature Tv.

When determining that the raw tire W has been heated at the vulcanization target temperature and has been pressurized at the vulcanization target pressure for the time H (FIG. 8, Y in S119), the control unit 70 makes an instruction for stopping the operations of the boiler 30A and the first heater 60 and closing the gas flow rate adjustment valve 510. With this, vulcanization of the raw tire W ends.

If the raw tire W has not been heated or pressurized for the time H, the control unit 70 repeats the cooling control and the heating control, thereby controlling the temperature of the raw tire W to be kept at the vulcanization target temperature Tv.

In the present embodiment, as described above, the order of the operation of the first heater 60 (the control (b)) and the introduction of nitrogen gas (the control (c)) can be changed. A control procedure in this case is described with reference to FIG. 10 and FIG. 11. However, portions identical to those of FIG. 8 and FIG. 9 are not described herein.

Figure 10:
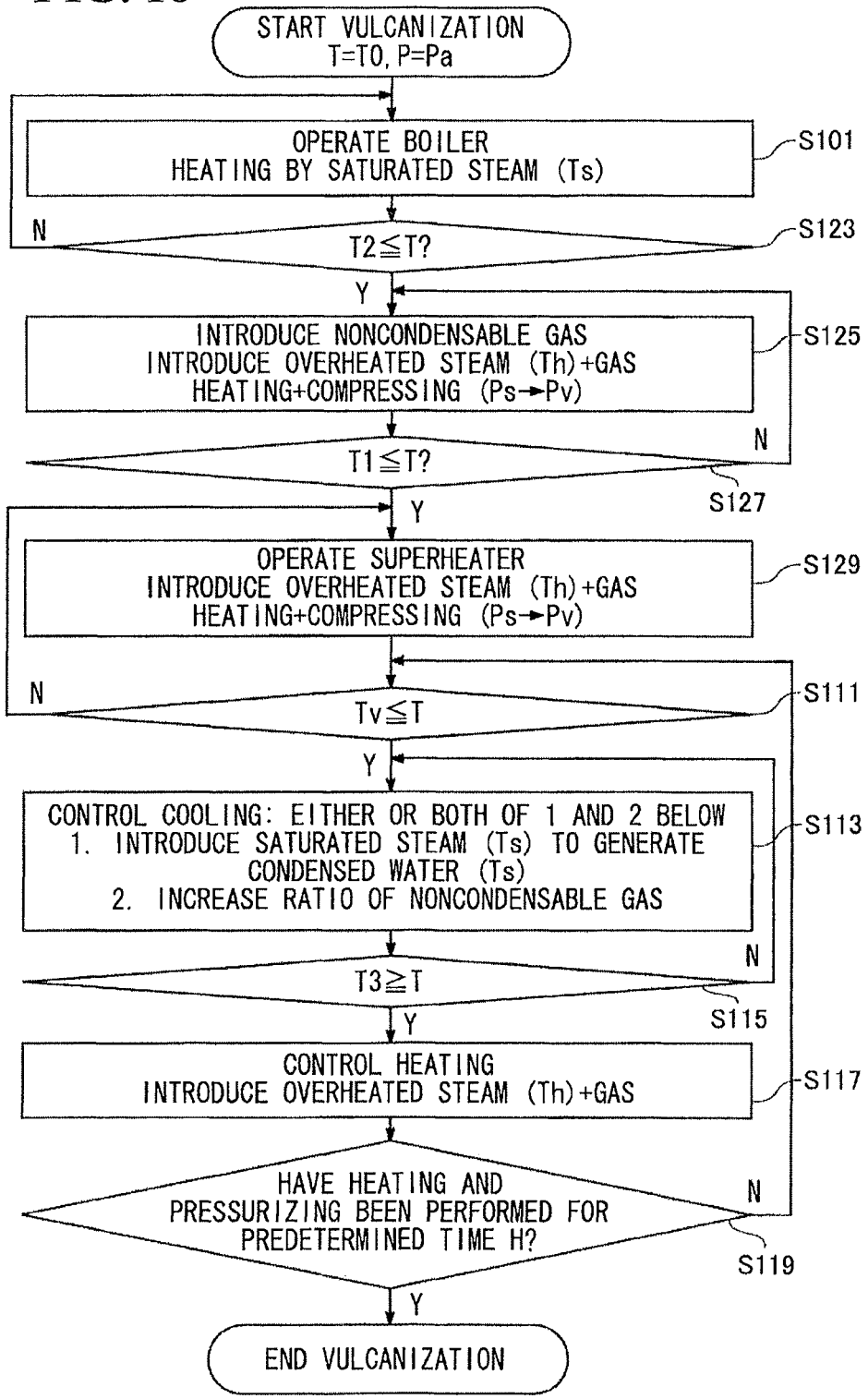
FIG. 10 is a flowchart of another example of the control procedure of the vulcanizing system in the fifth embodiment.
Figure 11:
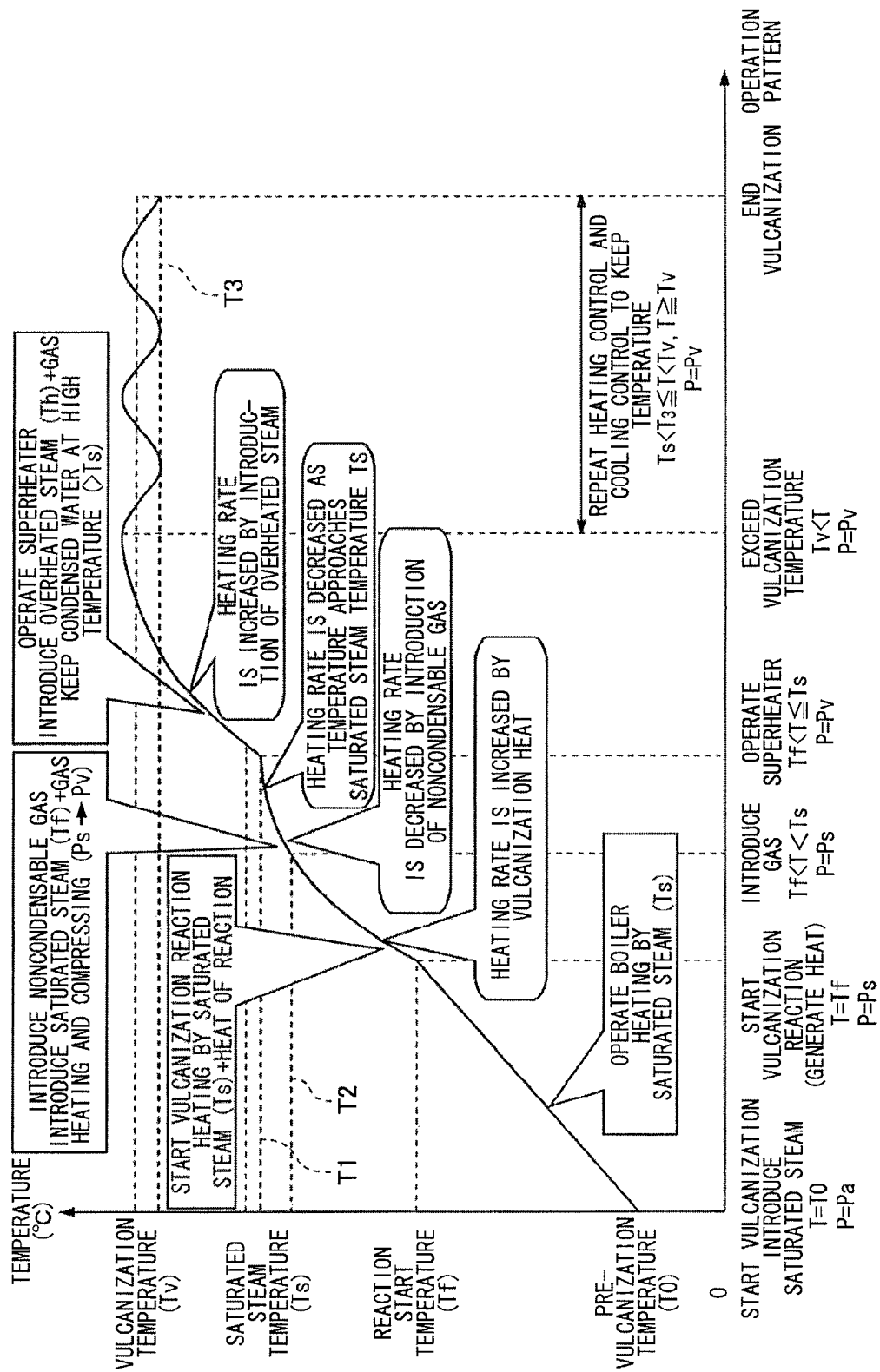
FIG. 11 is a diagram showing a tire's temperature behavior image according to the control procedure shown in FIG. 10.

Based on the information sent from a temperature sensor 71, the control unit 70 determines whether the temperature T of the raw tire W reaches the gas introduction start temperature T2 (FIG. 10, S123).

Then, if the raw tire W has reached the gas introduction start temperature T2 (FIG. 10, Y in S123), the gas flow rate adjustment valve 510 instructed by the control unit 70 is opened to a predetermined degree of opening, and nitrogen gas is introduced to the first supply path 400 (FIG. 10, S125).

With this, the vulcanizer 10 is supplied with the vulcanization medium including saturated steam and nitrogen gas, and the tire internal pressure reaches the tire vulcanization target pressure Pv. However, with the introduction of nitrogen gas, the heating rate of the raw tire W is decreased.

After nitrogen gas is introduced, based on the information sent from the temperature sensor 71, the control unit 70 determines whether the temperature T of the raw tire W reaches the heating start temperature T1 (FIG. 10, S127).

Then, if the raw tire W has reached the heating start temperature T1 (FIG. 10, Y in S127), the first heater 60 instructed by the control unit 70 starts operation (FIG. 10, S129). With this, the vulcanizer 10 is supplied with overheated steam at the temperature Th in place of saturated steam. Therefore, the vulcanizer 10 is supplied with the vulcanization medium including overheated steam and nitrogen gas, and the heating rate of the raw tire W is changed to be increased. Also, with the introduction of overheated steam, the condensed water can be kept at high temperature.

If the raw tire W has not reached the heating start temperature T1 (FIG. 10, N in S127), the control unit 70 continues the instruction for supplying the vulcanization medium including saturated steam and nitrogen gas to the vulcanizer 10.

As described above, the tire vulcanizing system 100 can be applied to a distributed-type vulcanizing system, and the structure in that case is now mentioned.

Figure 12:
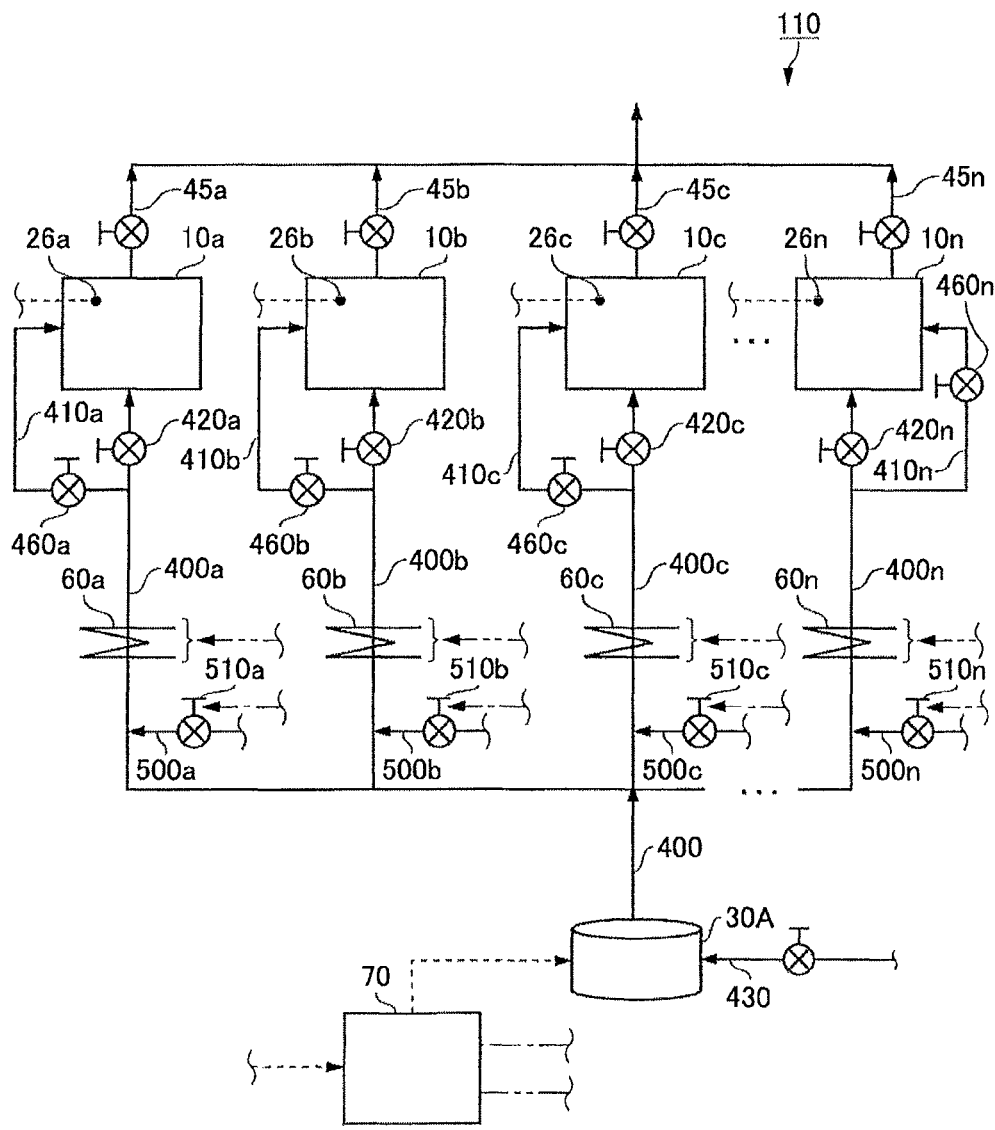
FIG. 12 is a block diagram of the structure of the vulcanizing system in the fifth embodiment in which steam is supplied from one boiler to a plurality of vulcanizers.

As shown in FIG. 12, this tire vulcanizing system 110 can vulcanize the raw tire W in a plurality of vulcanizers 10a, 10b, 10c, . . . 10n (n is 6 to 10, for example) with one boiler 30A.

The first supply path 400 having one end connected to the boiler 30A has the other end branched to branched first supply paths 400a, 400b, 400c, . . . 400n according to the number of vulcanizers 10a . . . . . The first supply paths 400a, 400b, 400c, . . . 400n are connected to the corresponding vulcanizers 10a, 10b, 10c, . . . 10n.

The branched first supply paths 400a, 400b, 400c, . . . 400n are provided with valves 420a, 420b, 420c, . . . 420n, respectively, and the amount of steam or the vulcanization medium including steam and nitrogen gas to be supplied to the vulcanizers 10a, 10b, 10c, . . . 10n can be adjusted.

The branched first supply paths 400a, 400b, 400c, . . . 400n are provided with gas supply paths 500a, 500b, 500c, . . . 500n and also first heaters 60a, 60b, 60c, . . . 60n, respectively. The gas supply paths 500a, 500b, 500c, . . . 500n are provided with gas flow rate adjustment valves 510a, 510b, 510c, . . . 510n adjusting the amount of nitrogen gas flowing through the branched first supply paths 400a, 400b, 400c, . . . 400n, respectively.

Second supply paths 410a, 410b, 410c, . . . 410n branched from the branched first supply paths 400a, 400b, 400c, . . . 400n are connected to the molds of the vulcanizers 10a, 10b, 10c, . . . 10n, respectively, to supply steam or the vulcanization medium including steam and nitrogen gas.

In the vulcanizing system 110, introduction of nitrogen gas from the gas supply paths 500a, 500b, 500c, . . . 500n and operations of the first heaters 60a, 60b, 60c, . . . 60n are performed in a manner similar to that of the tire vulcanizing system 100. The control unit 70 controls these operations independently for each of the vulcanizers 10a, 10b, 10c, . . . 10n.

As in the tire vulcanizing system 110, a distributed-type tire vulcanizing system can be constructed by, for example, setting six to ten vulcanizers 10a, 10b, 10c, . . . 10n as one group and placing a plurality of such groups in the industry building. In this case, the boiler 30A supplying steam is allocated to each group. Therefore, the piping length between the boiler 30A and the vulcanizers 10a . . . 10n can be shortened, and this heat dissipation from the piping can be decreased. Also, since the vulcanizers 10a, 10b, 10c, ... 10n are provided with the gas supply paths 500a, 500b, 500c, ... 500n and the first heaters 60a, 60b, 60c, ... 60n, respectively, in the tire vulcanizing system 110, an optimum vulcanization condition can be set for each vulcanizer. Also, by stopping the operation of a non-operated vulcanizer, energy-saving operation can be performed.

Sixth Embodiment

Figure 13:
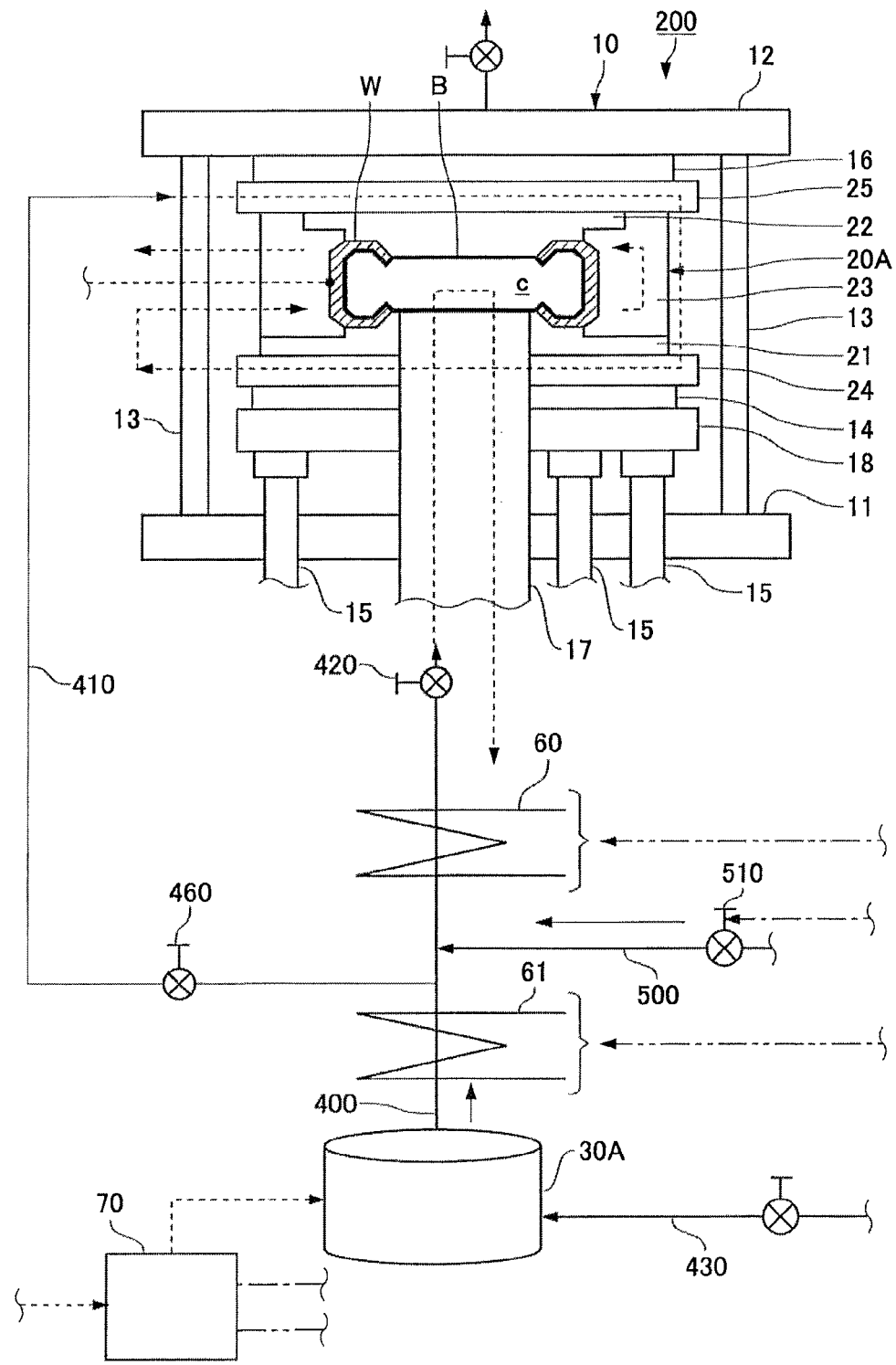
FIG. 13 is a block diagram of the structure of a vulcanizing system in a sixth embodiment

A sixth embodiment according to the present invention is described based on FIG. 13. Note that components identical to those in the fifth embodiment are provided with the same reference character as that of FIG. 7 and are not described herein.

A vulcanizing system 200 according to the sixth embodiment includes a second heater 61 on a part of the first supply path 400 which is located on an upstream side with respect to the gas supply path 500. Also, the vulcanizing system 200 includes a second supply path 410 which is branched from a part of the first supply path 400 which is located on an upstream side with respect to the gas supply path 500 and on a downstream side with respect to the second heater 61. The second supply path 410 having one end connected to the first supply path 400 has the other end connected to the mold 20A (platen and jacket) of the vulcanizer 10.

Steam (saturated steam) generated by the boiler 30A is temperature-boosted by the second heater 61, and partially passes through the second supply path 410 to be supplied to the bottom platen 24, the bolster platen 25 and tread mold 23, thereby heating the raw tire W from outside.

In the case of the collective-type vulcanizing system, steam at high temperature and high pressure (for example, at 198° C. and 1.5 MPa) obtained from a large-sized boiler is used as it is as a medium for heating the raw tire W from outside, but this medium does not require pressure. Therefore, when steam from a small-sized boiler with a distributed-type vulcanizing system being assumed is used as a medium for heating the raw tire W from outside, it is not required to add a pressurizing medium to boost the pressure. Thus, the second heater 61 is provided on an upstream side with respect to the gas supply path 500, and steam with only its temperature being increased is supplied via the second supply path 410 to the bottom platen 24 and the bolster platen 25.

The vulcanizing system 200 according to the sixth embodiment can achieve the following effects by including two heaters, i.e., the first heater 60 and the second heater 61.

By controlling the operation of each of the first heater 60 and the second heater 61, the temperature of the raw tire W can be adjusted not only from inside but also from outside. Vulcanizing the raw tire W under an optimum condition contributes to stabilization of the quality.

Also, when the tire temperature becomes 150° C. or higher in the latter half of vulcanization, the operation of the second heater 61 is controlled to boost the temperature of steam to 200° C. or higher, for example. With this, condensed water is kept at high temperature by the steam supplied from the second heater 61, and a hindrance to vulcanization due to a decrease in temperature of the condensed water can be prevented.

On the other hand, when the temperature of the raw tire W becomes too high, the operation of the second heater 61 is suppressed. With this, condensed water at low temperature is generated on purpose inside the raw tire W to cool the raw tire W.

Figure 14:
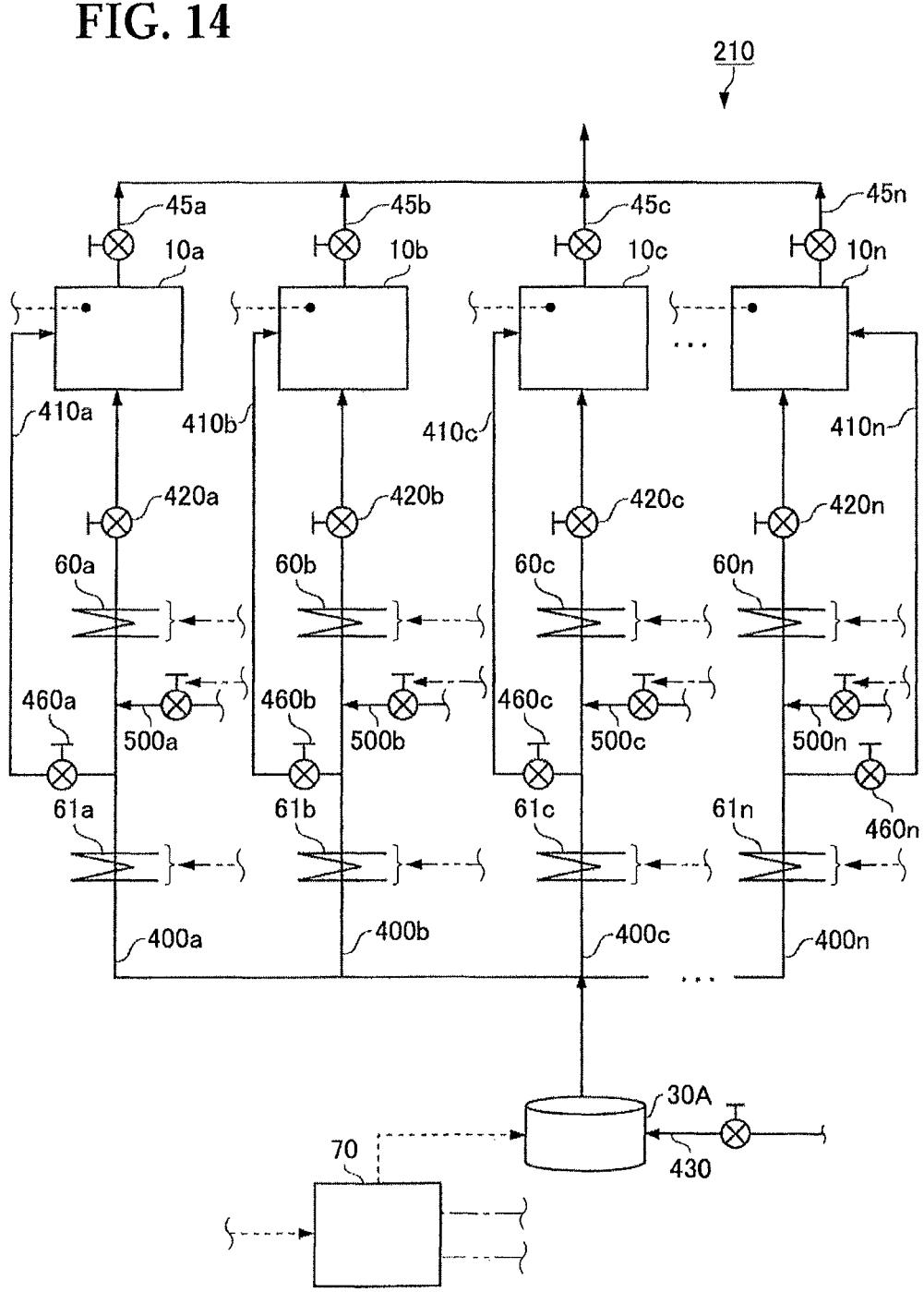
FIG. 14 is a block diagram of the structure of the vulcanizing system in the sixth embodiment in which steam is supplied from one boiler to a plurality of vulcanizers.
Figure 15:
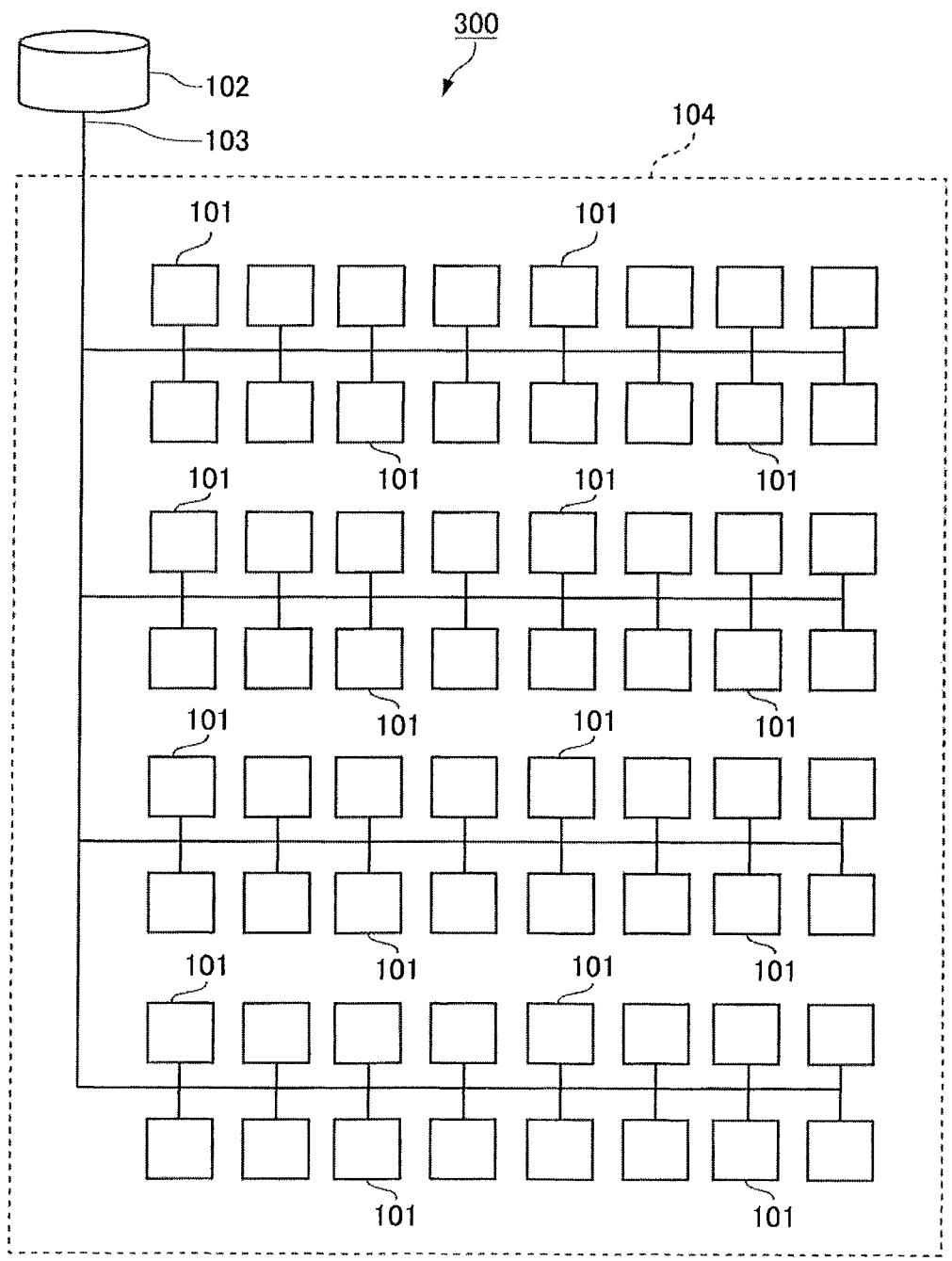
FIG. 15 is a diagram of an example of a conventional collective-type vulcanizing system.

The vulcanizing system 200 can also be applied to the distributed-type tire vulcanizing system 210 as shown in FIG. 14.

A difference from the tire vulcanizing system 110 shown in FIG. 12 is that second heaters 61a, 61b, 61c, ... 61n are provided on parts of the branched first supply paths 400a, 400b, 400c, ... 400n which are located on an upstream side with respect to the gas supply paths 500a, 500b, 500c, ... 500n.

While the present invention has been described above based on the embodiments, any of the configurations described in the embodiments described above can be selected or can be changed as appropriate to other configurations within the range of the present invention.

The invention claimed is:

1. A vulcanizing system, comprising:
a plurality of vulcanizers classified into groups, and
boilers each allocated to one of the groups for supplying steam to the vulcanizers in said one of the groups, wherein
a temperature booster and a pressure booster are provided on a steam supply path connecting one of the vulcanizers in each one of the groups to the respective boiler allocated to said one of the groups.

2. The vulcanizing system according to claim 1, wherein
the temperature booster and the pressure booster are sequentially arranged downstream of the respective boiler,
a mold-destined supply path for supplying the steam to a mold is branched from the steam supply path between the temperature booster and the pressure booster, and
the mold-destined supply path allows the steam temperature-boosted by the temperature booster to be supplied to the mold by bypassing the pressure booster.

3. The vulcanizing system according to claim 1, comprising a circulation route for collecting a drain occurring in each of the vulcanizers and circulating the drain to the respective boiler or the steam supply path.

4. The vulcanizing system according to claim 3, wherein the temperature booster is provided on the circulation route.

5. The vulcanizing system according to claim 1, wherein, for each one of the groups,
the steam supply path includes a main supply path connected to the respective boiler and a branch path branched from the main supply path toward at least one of the vulcanizers of said one of the groups, and
either one or both of the temperature booster and the pressure booster are provided on either one or both of the main supply path and the branch path.

6. A tire vulcanizing system in which saturated steam generated in one boiler is concurrently supplied to each of a plurality of vulcanizers, the system comprising:
a first supply path for supplying the saturated steam toward an internal space of a raw tire held in a mold of each of the plurality of the vulcanizers;
a second supply path branched from the first supply path for supplying the saturated steam toward the mold to heat the raw tire from outside;
a first heater provided on the first supply path for heating the saturated steam generated in the boiler to generate overheated steam;
a pressurizing medium supply path for supplying a pressurizing medium to the first supply path; and
a control unit controlling an operation of the tire vulcanizing system, wherein the control unit causes
- a temperature-boosting step of boosting a temperature of the raw tire toward a vulcanization target temperature and
- a pressurizing step of supplying the pressurizing medium to an internal space of the raw tire in a course of the temperature-boosting step toward the vulcanization target temperature to be executed, in the temperature-boosting step,
- the overheated steam generated by heating the saturated steam generated in the boiler is supplied to the internal space via the first supply path, and in the pressurizing step,
- the pressurizing medium is introduced from the pressurizing medium supply path to the first supply path, a vulcanization medium including the overheated steam and the pressurizing medium is supplied to the internal space to provide a temperature and a pressure required for vulcanization.

7. The tire vulcanizing system according to claim 6, wherein
in the temperature-boosting step,
- the saturated steam generated in the boiler is supplied to the internal space of the raw tire to boost the temperature of the raw tire, and then the overheated steam generated by heating the saturated steam is supplied to the internal space.

8. The tire vulcanizing system according to claim 6, wherein
the control unit performs temperature control in which cooling control and heating control are alternately performed when the temperature reaches a temperature defined with reference to the vulcanization target temperature, in the cooling control, either one or both of first cooling control and second cooling control are performed, wherein the first cooling control switches the overheated steam included in the supplied vulcanization medium to the saturated steam by stopping an operation of the first heater; and the second cooling control increases a ratio of the pressurizing medium included in the supplied vulcanization medium by increasing an amount of the pressurizing medium to be introduced from the pressurizing medium supply path, and in the heating control, either one or both of first heating control and second heating control are performed, wherein the first heating control, corresponding to the first cooling control, switches the saturated steam included in the supplied vulcanization medium to the overheated steam by operating the first heater; and the second heating control, corresponding to the second cooling control, decreases the ratio of the pressurizing medium included in the supplied vulcanization medium by decreasing the amount of the pressurizing medium to be introduced from the pressurizing medium supply path.

9. The tire vulcanizing system according to claim 6, wherein
- a second heater is provided on the first supply path, and is located upstream of the first heater and downstream of the boiler, and
- the second supply path is branched from the first supply path at a point between the first heater and the second heater, and said point is located upstream of the pressurizing medium supply path.

\* \* \* \* \*